US012762535B2

(12) United States Patent
Rule et al.

(10) Patent No.: US 12,762,535 B2
(45) Date of Patent: Oct. 13, 2026

(54) SERVER-SIDE REDIRECT OF UNIFORM RESOURCE LOCATOR GENERATED BY CONTACTLESS CARD

(71) Applicant: Capital One Services, LLC, McLean, VA (US)

(72) Inventors: Jeffrey Rule, Chevy Chase, MD (US); Kevin Osborn, Newton, MA (US)

(73) Assignee: Capital One Services, LLC, McLean, VA (US)

( * ) Notice: Subject to any disclaimer, the term of this patent is extended or adjusted under 35 U.S.C. 154(b) by 301 days.

(21) Appl. No.: 17/359,220

(22) Filed: Jun. 25, 2021

(65) Prior Publication Data

US 2022/0414648 A1 Dec. 29, 2022

(51) Int. Cl.

| | |
|---|---|
| ***G06Q 20/34*** | (2012.01) |
| ***G06N 20/00*** | (2019.01) |
| ***G06Q 20/38*** | (2012.01) |
| ***H04L 9/08*** | (2006.01) |

(52) U.S. Cl.

CPC ........... *G06Q 20/352* (2013.01); *G06N 20/00* (2019.01); *G06Q 20/3821* (2013.01); *H04L 9/088* (2013.01)

(58) Field of Classification Search

CPC .. G06Q 20/352; G06Q 20/3821; G06N 20/00; H04L 9/088

See application file for complete search history.

(56) References Cited

U.S. PATENT DOCUMENTS

| | | | |
|---|---|---|---|
| 4,683,553 | A | 7/1987 | Mollier |
| 4,827,113 | A | 5/1989 | Rikuna |
| 4,910,773 | A | 3/1990 | Hazard et al. |

(Continued)

FOREIGN PATENT DOCUMENTS

| | | | |
|---|---|---|---|
| CA | 3010336 | A1 | 7/2017 |
| CN | 101192295 | A | 6/2008 |

(Continued)

OTHER PUBLICATIONS

Geeksforgeeks.org, HTTP headers | Location, Nov. 7, 2019, "https://www.geeksforgeeks.org/http-headers-location/" (Year: 2019).*

(Continued)

*Primary Examiner* — Patrick Mcatee
*Assistant Examiner* — Zesheng Xiao
(74) *Attorney, Agent, or Firm* — KDW FIRM PLLC

(57) ABSTRACT

Systems, methods, apparatuses, and computer-readable media for server-side redirect of uniform resource locators (URLs) generated by contactless cards. In one aspect, a server may receive, from a client, a first request comprising a uniform resource locator (URL), where parameters of the URL include a cryptogram and a customer identifier of an account associated with the contactless card. The server may decrypt the cryptogram and determine a context of the account based on one or more attributes of the account. The server may select, based on the decryption of the cryptogram and the determined context, a first redirect URL of a plurality of redirect URLs. The server may transmit, to the client, a response including the redirect URL. The server may receive, from the client, a second request including the redirect URL. The server may transmit, to the client, a response including a resource at the redirect URL.

20 Claims, 15 Drawing Sheets

(56) References Cited

U.S. PATENT DOCUMENTS

| | | | |
|---|---|---|---|
| 5,036,461 | A | 7/1991 | Elliott et al. |
| 5,363,448 | A | 11/1994 | Koopman, Jr. et al. |
| 5,377,270 | A | 12/1994 | Koopman, Jr. et al. |
| 5,533,126 | A | 7/1996 | Hazard |
| 5,537,314 | A | 7/1996 | Kanter |
| 5,590,038 | A | 12/1996 | Pitroda |
| 5,592,553 | A | 1/1997 | Guski et al. |
| 5,616,901 | A | 4/1997 | Crandall |
| 5,666,415 | A | 9/1997 | Kaufman |
| 5,763,373 | A | 6/1998 | Robinson et al. |
| 5,764,789 | A | 6/1998 | Pare, Jr. et al. |
| 5,768,373 | A | 6/1998 | Lohstroh et al. |
| 5,778,072 | A | 7/1998 | Samar |
| 5,796,827 | A | 8/1998 | Coppersmith et al. |
| 5,832,090 | A | 11/1998 | Raspotnik |
| 5,883,810 | A | 3/1999 | Franklin et al. |
| 5,901,874 | A | 5/1999 | Deters |
| 5,929,413 | A | 7/1999 | Gardner |
| 5,960,411 | A | 9/1999 | Hartman et al. |
| 6,021,203 | A | 2/2000 | Douceur et al. |
| 6,049,328 | A | 4/2000 | Vanderheiden |
| 6,058,373 | A | 5/2000 | Blinn et al. |
| 6,061,666 | A | 5/2000 | Do et al. |
| 6,105,013 | A | 8/2000 | Curry et al. |
| 6,199,114 | B1 | 3/2001 | White et al. |
| 6,199,762 | B1 | 3/2001 | Hohle |
| 6,216,227 | B1 | 4/2001 | Goldstein et al. |
| 6,227,447 | B1 | 5/2001 | Campisano |
| 6,282,522 | B1 | 8/2001 | Davis et al. |
| 6,324,271 | B1 | 11/2001 | Sawyer et al. |
| 6,342,844 | B1 | 1/2002 | Rozin |
| 6,367,011 | B1 | 4/2002 | Lee et al. |
| 6,402,028 | B1 | 6/2002 | Graham, Jr. et al. |
| 6,438,550 | B1 | 8/2002 | Doyle et al. |
| 6,501,847 | B2 | 12/2002 | Helot et al. |
| 6,572,015 | B1 | 6/2003 | Norton |
| 6,631,197 | B1 | 10/2003 | Taenzer |
| 6,641,050 | B2 | 11/2003 | Kelley et al. |
| 6,655,585 | B2 | 12/2003 | Shinn |
| 6,662,020 | B1 | 12/2003 | Aaro et al. |
| 6,721,706 | B1 | 4/2004 | Strubbe et al. |
| 6,731,778 | B1 | 5/2004 | Oda et al. |
| 6,779,115 | B1 | 8/2004 | Naim |
| 6,792,533 | B2 | 9/2004 | Jablon |
| 6,829,711 | B1 | 12/2004 | Kwok et al. |
| 6,834,271 | B1 | 12/2004 | Hodgson et al. |
| 6,834,795 | B1 | 12/2004 | Rasmussen et al. |
| 6,852,031 | B1 | 2/2005 | Rowe |
| 6,865,547 | B1 | 3/2005 | Brake, Jr. et al. |
| 6,873,260 | B2 | 3/2005 | Lancos et al. |
| 6,877,656 | B1 | 4/2005 | Jaros et al. |
| 6,889,198 | B2 | 5/2005 | Kawan |
| 6,905,411 | B2 | 6/2005 | Nguyen et al. |
| 6,910,627 | B1 | 6/2005 | Simpson-Young et al. |
| 6,971,031 | B2 | 11/2005 | Haala |
| 6,990,588 | B1 | 1/2006 | Yasukura |
| 7,006,986 | B1 | 2/2006 | Sines et al. |
| 7,085,931 | B1 | 8/2006 | Smith et al. |
| 7,127,605 | B1 | 10/2006 | Montgomery et al. |
| 7,128,274 | B2 | 10/2006 | Kelley et al. |
| 7,140,550 | B2 | 11/2006 | Ramachandran |
| 7,152,045 | B2 | 12/2006 | Hoffman |
| 7,165,727 | B2 | 1/2007 | de Jong |
| 7,175,076 | B1 | 2/2007 | Block et al. |
| 7,202,773 | B1 | 4/2007 | Oba et al. |
| 7,206,806 | B2 | 4/2007 | Pineau |
| 7,232,073 | B1 | 6/2007 | de Jong |
| 7,246,752 | B2 | 7/2007 | Brown |
| 7,252,242 | B2 | 8/2007 | Ho |
| 7,254,569 | B2 | 8/2007 | Goodman et al. |
| 7,263,507 | B1 | 8/2007 | Brake, Jr. et al. |
| 7,270,276 | B2 | 9/2007 | Vayssiere |
| 7,278,025 | B2 | 10/2007 | Saito et al. |
| 7,287,692 | B1 | 10/2007 | Patel et al. |
| 7,290,709 | B2 | 11/2007 | Tsai et al. |
| 7,306,143 | B2 | 12/2007 | Bonneau, Jr. et al. |
| 7,319,986 | B2 | 1/2008 | Praisner et al. |
| 7,325,132 | B2 | 1/2008 | Takayama et al. |
| 7,373,515 | B2 | 5/2008 | Owen et al. |
| 7,374,099 | B2 | 5/2008 | de Jong |
| 7,375,616 | B2 | 5/2008 | Rowse et al. |
| 7,380,710 | B2 | 6/2008 | Brown |
| 7,424,977 | B2 | 9/2008 | Smets et al. |
| 7,453,439 | B1 | 11/2008 | Kushler et al. |
| 7,472,829 | B2 | 1/2009 | Brown |
| 7,487,357 | B2 | 2/2009 | Smith et al. |
| 7,527,208 | B2 | 5/2009 | Hammad |
| 7,568,631 | B2 | 8/2009 | Gibbs et al. |
| 7,584,153 | B2 | 9/2009 | Brown et al. |
| 7,597,250 | B2 | 10/2009 | Finn |
| 7,628,322 | B2 | 12/2009 | Holtmanns et al. |
| 7,652,578 | B2 | 1/2010 | Braun et al. |
| 7,689,832 | B2 | 3/2010 | Talmor et al. |
| 7,703,142 | B1 | 4/2010 | Wilson et al. |
| 7,748,609 | B2 | 7/2010 | Sachdeva et al. |
| 7,748,617 | B2 | 7/2010 | Gray |
| 7,748,636 | B2 | 7/2010 | Finn |
| 7,762,457 | B2 | 7/2010 | Bonalle et al. |
| 7,789,302 | B2 | 9/2010 | Tame |
| 7,793,851 | B2 | 9/2010 | Mullen |
| 7,796,013 | B2 | 9/2010 | Murakami et al. |
| 7,801,799 | B1 | 9/2010 | Brake, Jr. et al. |
| 7,801,829 | B2 | 9/2010 | Gray et al. |
| 7,805,755 | B2 | 9/2010 | Brown et al. |
| 7,809,643 | B2 | 10/2010 | Phillips et al. |
| 7,827,115 | B2 | 11/2010 | Weller et al. |
| 7,828,214 | B2 | 11/2010 | Narendra et al. |
| 7,848,746 | B2 | 12/2010 | Juels |
| 7,882,553 | B2 | 2/2011 | Tuliani |
| 7,900,048 | B2 | 3/2011 | Andersson |
| 7,908,216 | B1 | 3/2011 | Davis et al. |
| 7,922,082 | B2 | 4/2011 | Muscato |
| 7,933,589 | B1 | 4/2011 | Mamdani et al. |
| 7,949,559 | B2 | 5/2011 | Freiberg |
| 7,954,716 | B2 | 6/2011 | Narendra et al. |
| 7,954,723 | B2 | 6/2011 | Charrat |
| 7,962,369 | B2 | 6/2011 | Rosenberg |
| 7,993,197 | B2 | 8/2011 | Kaminkow |
| 8,005,426 | B2 | 8/2011 | Huomo et al. |
| 8,010,405 | B1 | 8/2011 | Bortolin et al. |
| RE42,762 | E | 9/2011 | Shin et al. |
| 8,041,954 | B2 | 10/2011 | Plesman |
| 8,060,012 | B2 | 11/2011 | Sklovsky et al. |
| 8,074,877 | B2 | 12/2011 | Mullen et al. |
| 8,082,450 | B2 | 12/2011 | Frey et al. |
| 8,095,113 | B2 | 1/2012 | Kean et al. |
| 8,099,332 | B2 | 1/2012 | Lemay et al. |
| 8,103,249 | B2 | 1/2012 | Markison |
| 8,108,687 | B2 | 1/2012 | Ellis et al. |
| 8,127,143 | B2 | 2/2012 | Abdallah et al. |
| 8,135,648 | B2 | 3/2012 | Oram et al. |
| 8,140,010 | B2 | 3/2012 | Symons et al. |
| 8,141,136 | B2 | 3/2012 | Lee et al. |
| 8,150,321 | B2 | 4/2012 | Winter et al. |
| 8,150,767 | B2 | 4/2012 | Wankmueller |
| 8,186,602 | B2 | 5/2012 | Itay et al. |
| 8,196,131 | B1 | 6/2012 | von Behren et al. |
| 8,215,563 | B2 | 7/2012 | Levy et al. |
| 8,224,753 | B2 | 7/2012 | Atef et al. |
| 8,232,879 | B2 | 7/2012 | Davis |
| 8,233,841 | B2 | 7/2012 | Griffin et al. |
| 8,245,292 | B2 | 8/2012 | Buer |
| 8,249,654 | B1 | 8/2012 | Zhu |
| 8,266,451 | B2 | 9/2012 | Leydier et al. |
| 8,276,814 | B1 | 10/2012 | Davis |
| 8,285,329 | B1 | 10/2012 | Zhu |
| 8,302,872 | B2 | 11/2012 | Mullen |
| 8,312,519 | B1 | 11/2012 | Bailey et al. |
| 8,316,237 | B1 | 11/2012 | Felsher et al. |
| 8,332,272 | B2 | 12/2012 | Fisher |
| 8,346,670 | B2 | 1/2013 | Hasson |
| 8,365,988 | B1 | 2/2013 | Medina, III et al. |
| 8,369,960 | B2 | 2/2013 | Tran et al. |
| 8,371,501 | B1 | 2/2013 | Hopkins |

(56) References Cited

U.S. PATENT DOCUMENTS 8,381,307 B2 2/2013 Cimino
8,391,719 B2 3/2013 Alameh et al.
8,417,231 B2 4/2013 Sanding et al.
8,439,271 B2 5/2013 Smets et al.
8,475,367 B1 7/2013 Yuen et al.
8,489,112 B2 7/2013 Roeding et al.
8,511,542 B2 8/2013 Pan
8,511,547 B2 8/2013 Rans
8,519,822 B2 8/2013 Riegebauer
8,559,872 B2 10/2013 Butler
8,566,916 B1 10/2013 Bailey et al.
8,567,670 B2 10/2013 Stanfield et al.
8,572,386 B2 10/2013 Takekawa et al.
8,577,810 B1 11/2013 Dalit et al.
8,583,454 B2 11/2013 Beraja et al.
8,589,335 B2 11/2013 Smith et al.
8,594,730 B2 11/2013 Bona et al.
8,615,468 B2 12/2013 Varadarajan
8,620,218 B2 12/2013 Awad
8,667,285 B2 3/2014 Coulier et al.
8,723,941 B1 5/2014 Shirbabadi et al.
8,726,405 B1 5/2014 Bailey et al.
8,740,073 B2 6/2014 Vijayshankar et al.
8,750,514 B2 6/2014 Gallo et al.
8,752,189 B2 6/2014 de Jong
8,794,509 B2 8/2014 Bishop et al.
8,799,668 B2 8/2014 Cheng
8,806,592 B2 8/2014 Ganesan
8,807,440 B1 8/2014 von Behren et al.
8,811,892 B2 8/2014 Khan et al.
8,814,039 B2 8/2014 Bishop et al.
8,814,052 B2 8/2014 Bona et al.
8,818,867 B2 8/2014 Baldwin et al.
8,850,538 B1 9/2014 Vernon et al.
8,861,733 B2 10/2014 Benteo et al.
8,870,081 B2 10/2014 Olson
8,880,027 B1 11/2014 Darringer
8,888,002 B2 11/2014 Marshall Chesney et al.
8,898,088 B2 11/2014 Springer et al.
8,934,837 B2 1/2015 Zhu et al.
8,977,569 B2 3/2015 Rao
8,994,498 B2 3/2015 Agrafioti et al.
9,004,365 B2 4/2015 Bona et al.
9,038,893 B2 5/2015 Kirkham
9,038,894 B2 5/2015 Khalid
9,042,814 B2 5/2015 Royston et al.
9,047,531 B2 6/2015 Showering et al.
9,069,976 B2 6/2015 Toole et al.
9,081,948 B2 7/2015 Magne
9,104,853 B2 8/2015 Venkataramani et al.
9,118,663 B1 8/2015 Bailey et al.
9,122,964 B2 9/2015 Krawczewicz
9,129,199 B2 9/2015 Spodak
9,129,280 B2 9/2015 Bona et al.
9,152,832 B2 10/2015 Royston et al.
9,183,490 B2 11/2015 Moreton
9,203,800 B2 12/2015 Izu et al.
9,209,867 B2 12/2015 Royston
9,251,330 B2 2/2016 Boivie et al.
9,251,518 B2 2/2016 Levin et al.
9,258,715 B2 2/2016 Borghei
9,270,337 B2 2/2016 Zhu et al.
9,275,325 B2 3/2016 Newcombe
9,286,606 B2 3/2016 Diamond
9,306,626 B2 4/2016 Hall et al.
9,306,753 B1 4/2016 Vandervort
9,306,942 B1 4/2016 Bailey et al.
9,324,066 B2 4/2016 Archer et al.
9,324,067 B2 4/2016 Van Os et al.
9,332,587 B2 5/2016 Salahshoor
9,338,622 B2 5/2016 Bjontegard
9,373,141 B1 6/2016 Shakkarwar
9,379,841 B2 6/2016 Fine et al.
9,413,430 B2 8/2016 Royston et al.
9,413,768 B1 8/2016 Gregg et al.
9,420,496 B1 8/2016 Indurkar
9,426,132 B1 8/2016 Alikhani
9,432,339 B1 8/2016 Bowness
9,455,968 B1 9/2016 Machani et al.
9,473,509 B2 10/2016 Arsanjani et al.
9,491,626 B2 11/2016 Sharma et al.
9,501,776 B2 11/2016 Martin
9,553,637 B2 1/2017 Yang et al.
9,619,952 B1 4/2017 Zhao et al.
9,635,000 B1 4/2017 Muftic
9,665,858 B1 5/2017 Kumar
9,674,705 B2 6/2017 Rose et al.
9,679,286 B2 6/2017 Colnot et al.
9,680,942 B2 6/2017 Dimmick
9,710,744 B2 7/2017 Wurmfeld
9,710,804 B2 7/2017 Zhou et al.
9,740,342 B2 8/2017 Paulsen et al.
9,740,988 B1 8/2017 Levin et al.
9,763,097 B2 9/2017 Robinson et al.
9,767,329 B2 9/2017 Forster
9,769,662 B1 9/2017 Queru
9,773,151 B2 9/2017 Mil'shtein et al.
9,780,953 B2 10/2017 Gaddam et al.
9,891,823 B2 2/2018 Feng et al.
9,940,571 B1 4/2018 Herrington
9,949,065 B1 4/2018 Zarakas
9,953,323 B2 4/2018 Candelore et al.
9,961,194 B1 5/2018 Wiechman et al.
9,965,632 B2 5/2018 Zarakas
9,965,756 B2 5/2018 Davis et al.
9,965,911 B2 5/2018 Wishne
9,977,890 B2 5/2018 Alberti
9,978,056 B2 5/2018 Seo
9,978,058 B2 5/2018 Wurmfeld et al.
9,990,795 B2 6/2018 Wurmfeld
10,007,873 B2 6/2018 Heo
10,013,693 B2 7/2018 Wyatt
10,043,164 B2 8/2018 Dogin et al.
10,075,437 B1 9/2018 Costigan et al.
10,121,130 B2 11/2018 Pinski
10,129,648 B1 11/2018 Hernandez et al.
10,133,979 B1 11/2018 Eidam et al.
10,210,505 B2 2/2019 Zarakas
10,217,105 B1 2/2019 Sangi et al.
10,242,368 B1 3/2019 Poole
10,296,910 B1 5/2019 Templeton
10,332,102 B2 6/2019 Zarakas
10,348,701 B2 * 7/2019 Figueroa ................. H04L 67/02
10,360,557 B2 7/2019 Locke
10,380,471 B2 8/2019 Locke
10,395,244 B1 8/2019 Mossler
10,453,054 B2 10/2019 Zarakas
10,474,941 B2 11/2019 Wurmfeld
10,475,027 B2 11/2019 Guise
10,482,453 B2 11/2019 Zarakas
10,482,457 B2 11/2019 Poole
10,489,774 B2 11/2019 Zarakas
10,489,781 B1 11/2019 Osborn
10,510,070 B2 12/2019 Wurmfeld
10,515,361 B2 12/2019 Zarakas
10,535,068 B2 1/2020 Locke
10,546,444 B2 1/2020 Osborn
10,581,611 B1 3/2020 Osborn
10,664,830 B1 5/2020 Rule
10,685,349 B2 6/2020 Brickell
10,797,882 B2 10/2020 Rule
10,880,741 B2 12/2020 Zarakas
10,909,525 B1 2/2021 Dhodapkar
10,970,691 B2 4/2021 Koeppel
10,984,416 B2 4/2021 Ilincic
11,037,136 B2 6/2021 Rule
11,037,195 B1 * 6/2021 Puri ................... G06Q 30/0255
11,062,098 B1 7/2021 Bergeron
11,120,453 B2 9/2021 Rule
11,138,593 B1 10/2021 Ho
11,138,605 B2 10/2021 Aabye
11,176,540 B2 11/2021 Gupta
11,188,908 B2 11/2021 Locke
11,216,806 B2 1/2022 Mossler

(56) References Cited

U.S. PATENT DOCUMENTS

| | | | |
|---|---|---|---|
| 11,297,958 B2 | 4/2022 | Vukich | |
| 11,334,872 B2 | 5/2022 | Phillips | |
| 11,361,173 B2 | 6/2022 | Edwards | |
| 11,392,933 B2 | 7/2022 | Mossler | |
| 11,392,935 B2 | 7/2022 | Suresh | |
| 11,416,844 B1 | 8/2022 | Osterkamp | |
| 11,423,392 B1 | 8/2022 | Ho | |
| 11,443,292 B2 | 9/2022 | Sherif | |
| 11,444,770 B2 | 9/2022 | Wieker | |
| 11,461,764 B2 | 10/2022 | Rule | |
| 11,481,764 B2 | 10/2022 | Shakkarwar | |
| 11,521,213 B2 | 12/2022 | Rule | |
| 11,551,200 B1 | 1/2023 | Cook | |
| 11,556,918 B2 | 1/2023 | Mestre | |
| 11,615,395 B2 | 3/2023 | McHugh | |
| 11,681,765 B2 * | 6/2023 | Pham | G06N 3/084 707/703 |
| 11,777,933 B2 | 10/2023 | Moreton | |
| 2001/0010723 A1 | 8/2001 | Pinkas | |
| 2001/0029485 A1 | 10/2001 | Brody et al. | |
| 2001/0034702 A1 | 10/2001 | Mockett et al. | |
| 2001/0054003 A1 | 12/2001 | Chien et al. | |
| 2002/0078345 A1 | 6/2002 | Sandhu et al. | |
| 2002/0093530 A1 | 7/2002 | Krothapalli et al. | |
| 2002/0100808 A1 | 8/2002 | Norwood et al. | |
| 2002/0120583 A1 | 8/2002 | Keresman, III et al. | |
| 2002/0152116 A1 | 10/2002 | Yan et al. | |
| 2002/0153424 A1 | 10/2002 | Li | |
| 2002/0165827 A1 | 11/2002 | Gien et al. | |
| 2003/0023554 A1 | 1/2003 | Yap et al. | |
| 2003/0034873 A1 | 2/2003 | Chase et al. | |
| 2003/0055727 A1 | 3/2003 | Walker et al. | |
| 2003/0078882 A1 | 4/2003 | Sukeda et al. | |
| 2003/0167350 A1 | 9/2003 | Davis et al. | |
| 2003/0208449 A1 | 11/2003 | Diao | |
| 2003/0220876 A1 | 11/2003 | Burger | |
| 2004/0015958 A1 | 1/2004 | Veil et al. | |
| 2004/0039919 A1 | 2/2004 | Takayama et al. | |
| 2004/0127256 A1 | 7/2004 | Goldthwaite et al. | |
| 2004/0215674 A1 | 10/2004 | Odinak et al. | |
| 2004/0230799 A1 | 11/2004 | Davis | |
| 2005/0044367 A1 | 2/2005 | Gasparini et al. | |
| 2005/0075985 A1 | 4/2005 | Cartmell | |
| 2005/0081038 A1 | 4/2005 | Arditti Modiano et al. | |
| 2005/0138387 A1 | 6/2005 | Lam et al. | |
| 2005/0156026 A1 | 7/2005 | Ghosh et al. | |
| 2005/0160049 A1 | 7/2005 | Lundholm | |
| 2005/0195975 A1 | 9/2005 | Kawakita | |
| 2005/0228997 A1 | 10/2005 | Bicker | |
| 2005/0247797 A1 | 11/2005 | Ramachandran | |
| 2005/0269402 A1 | 12/2005 | Spitzer | |
| 2006/0006230 A1 | 1/2006 | Bear et al. | |
| 2006/0040726 A1 | 2/2006 | Szrek et al. | |
| 2006/0041402 A1 | 2/2006 | Baker | |
| 2006/0044153 A1 | 3/2006 | Dawidowsky | |
| 2006/0047954 A1 | 3/2006 | Sachdeva et al. | |
| 2006/0085848 A1 | 4/2006 | Aissi et al. | |
| 2006/0136334 A1 | 6/2006 | Atkinson et al. | |
| 2006/0173985 A1 | 8/2006 | Moore | |
| 2006/0174331 A1 | 8/2006 | Schuetz | |
| 2006/0242698 A1 | 10/2006 | Inskeep et al. | |
| 2006/0280338 A1 | 12/2006 | Rabb | |
| 2007/0033642 A1 | 2/2007 | Ganesan et al. | |
| 2007/0055630 A1 | 3/2007 | Gauthier et al. | |
| 2007/0061266 A1 | 3/2007 | Moore et al. | |
| 2007/0061487 A1 | 3/2007 | Moore et al. | |
| 2007/0116292 A1 | 5/2007 | Kurita et al. | |
| 2007/0118745 A1 | 5/2007 | Buer | |
| 2007/0197261 A1 | 8/2007 | Humbel | |
| 2007/0224969 A1 | 9/2007 | Rao | |
| 2007/0241182 A1 | 10/2007 | Buer | |
| 2007/0256134 A1 | 11/2007 | Lehtonen et al. | |
| 2007/0258594 A1 | 11/2007 | Sandhu et al. | |
| 2007/0276765 A1 | 11/2007 | Hazel | |
| 2007/0278291 A1 | 12/2007 | Rans et al. | |
| 2008/0008315 A1 | 1/2008 | Fontana et al. | |
| 2008/0011831 A1 | 1/2008 | Bonalle et al. | |
| 2008/0014867 A1 | 1/2008 | Finn | |
| 2008/0035738 A1 | 2/2008 | Mullen | |
| 2008/0071681 A1 | 3/2008 | Khalid | |
| 2008/0072303 A1 | 3/2008 | Syed | |
| 2008/0082452 A1 | 4/2008 | Wankmueller | |
| 2008/0086767 A1 | 4/2008 | Kulkarni et al. | |
| 2008/0099552 A1 | 5/2008 | Grillion | |
| 2008/0103968 A1 | 5/2008 | Bies et al. | |
| 2008/0109309 A1 | 5/2008 | Landau et al. | |
| 2008/0110983 A1 | 5/2008 | Ashfield | |
| 2008/0120711 A1 | 5/2008 | Dispensa | |
| 2008/0156873 A1 | 7/2008 | Wilhelm et al. | |
| 2008/0162312 A1 | 7/2008 | Sklovsky et al. | |
| 2008/0164308 A1 | 7/2008 | Aaron et al. | |
| 2008/0207307 A1 | 8/2008 | Cunningham II et al. | |
| 2008/0209543 A1 | 8/2008 | Aaron | |
| 2008/0223918 A1 | 9/2008 | Williams et al. | |
| 2008/0285746 A1 | 11/2008 | Landrock et al. | |
| 2008/0308641 A1 | 12/2008 | Finn | |
| 2009/0037275 A1 | 2/2009 | Pollio | |
| 2009/0048026 A1 | 2/2009 | French | |
| 2009/0132417 A1 | 5/2009 | Scipioni et al. | |
| 2009/0143104 A1 | 6/2009 | Loh et al. | |
| 2009/0171682 A1 | 7/2009 | Dixon et al. | |
| 2009/0210308 A1 | 8/2009 | Toomer et al. | |
| 2009/0235339 A1 | 9/2009 | Mennes et al. | |
| 2009/0249077 A1 | 10/2009 | Gargaro et al. | |
| 2009/0282264 A1 | 11/2009 | Ameil et al. | |
| 2010/0023449 A1 | 1/2010 | Skowronek et al. | |
| 2010/0023455 A1 | 1/2010 | Dispensa et al. | |
| 2010/0029202 A1 | 2/2010 | Jolivet et al. | |
| 2010/0033310 A1 | 2/2010 | Narendra et al. | |
| 2010/0036769 A1 | 2/2010 | Winters et al. | |
| 2010/0078471 A1 | 4/2010 | Lin et al. | |
| 2010/0082491 A1 | 4/2010 | Rosenblatt et al. | |
| 2010/0094754 A1 | 4/2010 | Bertran et al. | |
| 2010/0095130 A1 | 4/2010 | Bertran et al. | |
| 2010/0100480 A1 | 4/2010 | Altman et al. | |
| 2010/0114731 A1 | 5/2010 | Kingston et al. | |
| 2010/0192230 A1 | 7/2010 | Steeves et al. | |
| 2010/0207742 A1 | 8/2010 | Buhot et al. | |
| 2010/0211797 A1 | 8/2010 | Westerveld et al. | |
| 2010/0240413 A1 | 9/2010 | He et al. | |
| 2010/0257357 A1 | 10/2010 | McClain | |
| 2010/0312634 A1 | 12/2010 | Cervenka | |
| 2010/0312635 A1 | 12/2010 | Cervenka | |
| 2010/0317318 A1 * | 12/2010 | Carter | H04L 12/1464 455/408 |
| 2011/0028160 A1 | 2/2011 | Roeding et al. | |
| 2011/0035604 A1 | 2/2011 | Habraken | |
| 2011/0060631 A1 | 3/2011 | Grossman et al. | |
| 2011/0068170 A1 | 3/2011 | Lehman | |
| 2011/0084132 A1 | 4/2011 | Tofighbakhsh | |
| 2011/0101093 A1 | 5/2011 | Ehrensvard | |
| 2011/0113245 A1 | 5/2011 | Varadarajan | |
| 2011/0125638 A1 | 5/2011 | Davis et al. | |
| 2011/0131415 A1 | 6/2011 | Schneider | |
| 2011/0153437 A1 | 6/2011 | Archer et al. | |
| 2011/0153496 A1 | 6/2011 | Royyuru | |
| 2011/0155801 A1 | 6/2011 | Rowberry | |
| 2011/0208658 A1 | 8/2011 | Makhotin | |
| 2011/0208965 A1 | 8/2011 | Machani | |
| 2011/0211219 A1 | 9/2011 | Bradley et al. | |
| 2011/0218911 A1 | 9/2011 | Spodak | |
| 2011/0238564 A1 | 9/2011 | Lim et al. | |
| 2011/0246780 A1 | 10/2011 | Yeap et al. | |
| 2011/0258452 A1 | 10/2011 | Coulier et al. | |
| 2011/0280406 A1 | 11/2011 | Ma et al. | |
| 2011/0282785 A1 | 11/2011 | Chin | |
| 2011/0294418 A1 | 12/2011 | Chen | |
| 2011/0312271 A1 | 12/2011 | Ma et al. | |
| 2012/0024947 A1 | 2/2012 | Naelon | |
| 2012/0030047 A1 | 2/2012 | Fuentes et al. | |
| 2012/0030121 A1 | 2/2012 | Grellier | |
| 2012/0047071 A1 | 2/2012 | Mullen et al. | |
| 2012/0079281 A1 | 3/2012 | Lowenstein et al. | |
| 2012/0109735 A1 | 5/2012 | Krawczewicz et al. | |

(56) References Cited

U.S. PATENT DOCUMENTS

2012/0109764 A1 5/2012 Martin et al.
2012/0143703 A1 6/2012 Wall
2012/0143754 A1 6/2012 Patel
2012/0150737 A1 6/2012 Rottink et al.
2012/0178366 A1 7/2012 Levy et al.
2012/0196583 A1 8/2012 Kindo
2012/0207305 A1 8/2012 Gallo et al.
2012/0209773 A1 8/2012 Ranganathan
2012/0238206 A1 9/2012 Singh et al.
2012/0239560 A1 9/2012 Pourfallah et al.
2012/0252350 A1 10/2012 Steinmetz et al.
2012/0254394 A1 10/2012 Barras
2012/0284194 A1 11/2012 Liu et al.
2012/0290472 A1 11/2012 Mullen et al.
2012/0296818 A1 11/2012 Nuzzi et al.
2012/0316992 A1 12/2012 Oborne
2012/0317035 A1 12/2012 Royyuru et al.
2012/0317628 A1 12/2012 Yeager
2013/0005245 A1 1/2013 Royston
2013/0008956 A1 1/2013 Ashfield
2013/0026229 A1 1/2013 Jarman et al.
2013/0030997 A1 1/2013 Spodak
2013/0048713 A1 2/2013 Pan
2013/0054474 A1 2/2013 Yeager
2013/0065564 A1 3/2013 Conner et al.
2013/0080228 A1 3/2013 Fisher
2013/0080229 A1 3/2013 Fisher
2013/0099587 A1 4/2013 Lou et al.
2013/0104251 A1 4/2013 Moore et al.
2013/0106576 A1 5/2013 Hinman et al.
2013/0119130 A1 5/2013 Braams
2013/0130614 A1 5/2013 Busch-Sorensen
2013/0144793 A1 6/2013 Royston
2013/0146657 A1 6/2013 Graef
2013/0171929 A1 7/2013 Adams et al.
2013/0179351 A1 7/2013 Wallner
2013/0185772 A1 7/2013 Jaudon et al.
2013/0191279 A1 7/2013 Calman et al.
2013/0200999 A1 8/2013 Spodak et al.
2013/0211937 A1 8/2013 Elbirt
2013/0216108 A1 8/2013 Hwang et al.
2013/0226791 A1 8/2013 Springer et al.
2013/0226796 A1 8/2013 Jiang et al.
2013/0232082 A1 9/2013 Krawczewicz et al.
2013/0238894 A1 9/2013 Ferg et al.
2013/0282360 A1 10/2013 Shimota et al.
2013/0303085 A1 11/2013 Boucher et al.
2013/0304651 A1 11/2013 Smith
2013/0311363 A1 11/2013 Ramaci
2013/0312082 A1 11/2013 Izu et al.
2013/0314593 A1 11/2013 Reznik et al.
2013/0344857 A1 12/2013 Berionne et al.
2014/0002238 A1 1/2014 Taveau et al.
2014/0019352 A1 1/2014 Shrivastava
2014/0027506 A1 1/2014 Heo et al.
2014/0032409 A1 1/2014 Rosano
2014/0032410 A1 1/2014 Georgiev et al.
2014/0040120 A1 2/2014 Cho et al.
2014/0040139 A1 2/2014 Brudnicki et al.
2014/0040147 A1 2/2014 Varadarakan et al.
2014/0047235 A1 2/2014 Lessiak et al.
2014/0067690 A1 3/2014 Pitroda et al.
2014/0074637 A1 3/2014 Hammad
2014/0074655 A1 3/2014 Lim et al.
2014/0081720 A1 3/2014 Wu
2014/0081785 A1 3/2014 Valadas Preto
2014/0138435 A1 5/2014 Khalid
2014/0171034 A1 6/2014 Aleksin et al.
2014/0171039 A1 6/2014 Bjontegard
2014/0172700 A1 6/2014 Teuwen et al.
2014/0180851 A1 6/2014 Fisher
2014/0208112 A1 7/2014 McDonald et al.
2014/0214674 A1 7/2014 Narula
2014/0229375 A1 8/2014 Zaytzsev et al.
2014/0245391 A1 8/2014 Adenuga
2014/0256251 A1 9/2014 Caceres et al.
2014/0258099 A1 9/2014 Rosano
2014/0258113 A1 9/2014 Gauthier et al.
2014/0258125 A1 9/2014 Gerber et al.
2014/0274179 A1 9/2014 Zhu et al.
2014/0279479 A1 9/2014 Maniar et al.
2014/0337235 A1 11/2014 Van Heerden et al.
2014/0339315 A1 11/2014 Ko
2014/0346860 A1 11/2014 Aubry et al.
2014/0365377 A1 12/2014 Salama
2014/0365780 A1 12/2014 Movassaghi
2014/0379361 A1 12/2014 Mahadkar et al.
2015/0012444 A1 1/2015 Brown et al.
2015/0032635 A1 1/2015 Guise
2015/0071486 A1 3/2015 Rhoads et al.
2015/0073983 A1 3/2015 Bartenstein
2015/0088757 A1 3/2015 Zhou et al.
2015/0089586 A1 3/2015 Ballesteros
2015/0113271 A1 4/2015 Jooste
2015/0134452 A1 5/2015 Williams
2015/0134513 A1 5/2015 Olson
2015/0140960 A1 5/2015 Powell et al.
2015/0154595 A1 6/2015 Collinge et al.
2015/0170138 A1 6/2015 Rao
2015/0178724 A1 6/2015 Ngo et al.
2015/0186871 A1 7/2015 Laracey
2015/0199673 A1 7/2015 Savolainen
2015/0199863 A1 7/2015 Scoggins
2015/0205379 A1 7/2015 Mag et al.
2015/0254637 A1 9/2015 Yang
2015/0302409 A1 10/2015 Malek et al.
2015/0317295 A1 11/2015 Sherry
2015/0317626 A1 11/2015 Ran et al.
2015/0332266 A1 11/2015 Friedlander et al.
2015/0339474 A1 11/2015 Paz et al.
2015/0371234 A1 12/2015 Huang et al.
2016/0012465 A1 1/2016 Sharp
2016/0026997 A1 1/2016 Tsui et al.
2016/0048913 A1 2/2016 Rausaria et al.
2016/0055480 A1 2/2016 Shah
2016/0057619 A1 2/2016 Lopez
2016/0065370 A1 3/2016 Le Saint et al.
2016/0078430 A1 3/2016 Douglas
2016/0087957 A1 3/2016 Shah et al.
2016/0092696 A1 3/2016 Guglani et al.
2016/0148193 A1 5/2016 Kelley et al.
2016/0189143 A1 6/2016 Koeppel
2016/0232523 A1 8/2016 Venot et al.
2016/0239672 A1 8/2016 Khan et al.
2016/0253651 A1 9/2016 Park et al.
2016/0255072 A1 9/2016 Liu
2016/0267486 A1 9/2016 Mitra et al.
2016/0277383 A1 9/2016 Guyomarc'h et al.
2016/0277388 A1 9/2016 Lowe et al.
2016/0307187 A1 10/2016 Guo et al.
2016/0307189 A1 10/2016 Zarakas et al.
2016/0314472 A1 10/2016 Ashfield
2016/0330027 A1 11/2016 Ebrahimi
2016/0335531 A1 11/2016 Mullen et al.
2016/0379217 A1 12/2016 Hammad
2017/0004502 A1 1/2017 Quentin et al.
2017/0011395 A1 1/2017 Pillai et al.
2017/0011406 A1 1/2017 Tunnell et al.
2017/0017957 A1 1/2017 Radu
2017/0017964 A1 1/2017 Janefalkar et al.
2017/0024716 A1 1/2017 Jiam et al.
2017/0039566 A1 2/2017 Schipperheijn
2017/0041759 A1 2/2017 Gantert et al.
2017/0068950 A1 3/2017 Kwon
2017/0103388 A1 4/2017 Pillai et al.
2017/0104739 A1 4/2017 Lansler et al.
2017/0109509 A1 4/2017 Baghdasaryan
2017/0109730 A1 4/2017 Locke et al.
2017/0116447 A1 4/2017 Cimino et al.
2017/0124568 A1 5/2017 Moghadam
2017/0140379 A1 5/2017 Deck
2017/0154328 A1 6/2017 Zarakas et al.
2017/0154333 A1 6/2017 Gleeson et al.
2017/0180134 A1 6/2017 King

(56) References Cited

U.S. PATENT DOCUMENTS

| | | | |
|---|---|---|---|
| 2017/0230189 | A1 | 8/2017 | Toll et al. |
| 2017/0237301 | A1 | 8/2017 | Elad et al. |
| 2017/0289127 | A1 | 10/2017 | Hendrick |
| 2017/0295013 | A1 | 10/2017 | Claes |
| 2017/0316696 | A1 | 11/2017 | Bartel |
| 2017/0317834 | A1 | 11/2017 | Smith et al. |
| 2017/0330173 | A1 | 11/2017 | Woo et al. |
| 2017/0374070 | A1 | 12/2017 | Shah et al. |
| 2018/0034507 | A1 | 2/2018 | Wobak et al. |
| 2018/0039986 | A1 | 2/2018 | Essebag et al. |
| 2018/0039987 | A1 | 2/2018 | Molino |
| 2018/0063122 | A1* | 3/2018 | Enoki ................. H04L 63/0815 |
| 2018/0068316 | A1 | 3/2018 | Essebag et al. |
| 2018/0129945 | A1 | 5/2018 | Saxena et al. |
| 2018/0160255 | A1 | 6/2018 | Park |
| 2018/0191501 | A1 | 7/2018 | Lindemann |
| 2018/0205712 | A1 | 7/2018 | Versteeg et al. |
| 2018/0240106 | A1 | 8/2018 | Garrett et al. |
| 2018/0254909 | A1 | 9/2018 | Hancock |
| 2018/0268132 | A1 | 9/2018 | Buer et al. |
| 2018/0270214 | A1 | 9/2018 | Caterino et al. |
| 2018/0294959 | A1 | 10/2018 | Traynor et al. |
| 2018/0300716 | A1 | 10/2018 | Carlson |
| 2018/0302396 | A1 | 10/2018 | Camenisch et al. |
| 2018/0315050 | A1 | 11/2018 | Hammad |
| 2018/0316666 | A1 | 11/2018 | Koved et al. |
| 2018/0322486 | A1 | 11/2018 | Deliwala et al. |
| 2018/0359100 | A1 | 12/2018 | Gaddam et al. |
| 2019/0014107 | A1 | 1/2019 | George |
| 2019/0019375 | A1 | 1/2019 | Foley |
| 2019/0028462 | A1* | 1/2019 | Ishikawa ............... H04L 63/102 |
| 2019/0036678 | A1 | 1/2019 | Ahmed |
| 2019/0172055 | A1 | 6/2019 | Hale |
| 2019/0179894 | A1* | 6/2019 | Anerousis ................. G06F 8/70 |
| 2019/0238517 | A1 | 8/2019 | D'Agostino et al. |
| 2019/0303945 | A1 | 10/2019 | Mitra |
| 2020/0065310 | A1* | 2/2020 | Poh ..................... G06F 16/2455 |
| 2021/0004806 | A1 | 1/2021 | Noe |
| 2021/0099868 | A1* | 4/2021 | Damlaj ................. H04L 67/146 |
| 2021/0272098 | A1 | 9/2021 | Delsuc |
| 2021/0304189 | A1 | 9/2021 | Gupta |
| 2021/0383360 | A1 | 12/2021 | Sinha |
| 2021/0406869 | A1 | 12/2021 | Pathrabe |
| 2022/0114581 | A1 | 4/2022 | Upadhye |
| 2022/0222706 | A1* | 7/2022 | Arora ................. G06Q 30/0256 |
| 2022/0284416 | A1 | 9/2022 | Rule |
| 2022/0309509 | A1 | 9/2022 | Akgun |
| 2022/0335412 | A1 | 10/2022 | Rule |
| 2022/0366410 | A1 | 11/2022 | Rule |
| 2022/0398566 | A1 | 12/2022 | Rule |
| 2022/0414648 | A1 | 12/2022 | Rule |
| 2023/0054157 | A1 | 2/2023 | Mao |
| 2023/0065163 | A1 | 3/2023 | Vargas |
| 2023/0083785 | A1 | 3/2023 | Maiman |
| 2023/0169505 | A1 | 6/2023 | Rule |
| 2023/0354020 | A1 | 11/2023 | Rule |
| 2023/0359839 | A1 | 11/2023 | Lovgren |

FOREIGN PATENT DOCUMENTS

| | | | | |
|---|---|---|---|---|
| CN | 103023643 | A | 4/2013 | |
| CN | 103417202 | A | 12/2013 | |
| EP | 1085424 | A1 | 3/2001 | |
| EP | 1223565 | A1 | 7/2002 | |
| EP | 1265186 | A2 | 12/2002 | |
| EP | 1783919 | A1 | 5/2007 | |
| EP | 2139196 | A1 | 12/2009 | |
| EP | 1469419 | A1 | 8/2012 | |
| EP | 2852070 | A1 | 3/2015 | |
| EP | 3582166 | A1 * | 12/2019 | ......... G06Q 20/3278 |
| GB | 2457221 | A | 8/2009 | |
| GB | 2516861 | A | 2/2015 | |
| GB | 2551907 | A | 1/2018 | |
| KR | 101508320 | B1 | 4/2015 | |
| KR | 20150140132 | A | 12/2015 | |
| WO | 9910824 | A1 | 3/1999 | |
| WO | 0049586 | A1 | 8/2000 | |
| WO | 2006070189 | A2 | 7/2006 | |
| WO | 2008055170 | A2 | 5/2008 | |
| WO | 2009025605 | A2 | 2/2009 | |
| WO | 2010049252 | A1 | 5/2010 | |
| WO | 2011112158 | A1 | 9/2011 | |
| WO | 2012001624 | A1 | 1/2012 | |
| WO | 2013039395 | A1 | 3/2013 | |
| WO | 2013155562 | A1 | 10/2013 | |
| WO | 2013192358 | A2 | 12/2013 | |
| WO | 2014043278 | A1 | 3/2014 | |
| WO | 2014170741 | A2 | 10/2014 | |
| WO | 2015179649 | A1 | 11/2015 | |
| WO | 2015183818 | A1 | 12/2015 | |
| WO | 2016097718 | A1 | 6/2016 | |
| WO | 2016160816 | A1 | 10/2016 | |
| WO | 2016168394 | A1 | 10/2016 | |
| WO | 2017042375 | A1 | 3/2017 | |
| WO | 2017042400 | A1 | 3/2017 | |
| WO | 2017047855 | A1 | 3/2017 | |
| WO | 2017157859 | A1 | 9/2017 | |
| WO | 2017208063 | A1 | 12/2017 | |
| WO | 2018063809 | A1 | 4/2018 | |
| WO | 2018137888 | A1 | 8/2018 | |
| WO | 2019022585 | A1 | 1/2019 | |
| WO | 2021051884 | A1 | 3/2021 | |
| WO | 2021133492 | A1 | 7/2021 | |
| WO | 2022108959 | A1 | 5/2022 | |
| WO | 2022187350 | A1 | 9/2022 | |
| WO | 2023017943 | A1 | 2/2023 | |
| WO | 2023064063 | A1 | 4/2023 | |

OTHER PUBLICATIONS

International Search Report and Written Opinion for Application No. PCT/US2022/023257, mailed Jul. 26, 2022, 10 pages.

Batina, L. and Poll, E., "SmartCards and RFID", Course PowerPoint Presentation for IPA Security Course, Digital Security at University of Nijmegen, Netherlands (date unknown) 75 pages.

Haykin, M. and Warnar, R., "Smart Card Technology: New Methods for Computer Access Control", Computer Science and Technology NIST Special Publication 500-157:1-60 (1988).

Lehpamer, H., "Component of the RFID System", RFID Design Principles, 2nd edition pp. 133-201 (2012).

Author Unknown, "CardrefresherSM from American Express®", [online] 2019 [retrieved on Mar. 25, 2019]. Retrieved from Internet URL: https://merchant-channel.americanexpress.com/merchant/en_US/cardrefresher, 2 pages.

Author Unknown, "Add Account Updater to your recurring payment tool", [online] 2018-2019 [retrieved on Mar. 25, 2019]. Retrieved from Internet URL: https://www.authorize.net/our-features/account-updater/, 5 pages.

Author Unknown, "Visa® Account Updater for Merchants", [online] 2019 [retrieved on Mar. 25, 2019]. Retrieved from Internet URL: https://usa.visa.com/dam/VCOM/download/merchants/visa-account-updater-product-information-fact-sheet-for-merchants.pdf, 2 pages.

Author Unknown, "Manage the cards that you use with Apple Pay", Apple Support [online] 2019 [retrieved on Mar. 25, 2019]. Retrieved from Internet URL: https://support.apple.com/en-us/HT205583, 5 pages.

Author Unknown, "Contactless Specifications for Payment Systems", EMV Book B—Entry Point Specification [online] 2016 [retrieved on Mar. 25, 2019]. Retrieved from Internet URL: https://www.emvco.com/wp-content/uploads/2017/05/BookB_Entry_Point_Specification_v2_6_20160809023257319.pdf, 52 pages.

Author Unknown, "EMV Integrated Circuit Card Specifcations for Payment Systems, Book 2, Security and Key Management," Version 3.4, [online] 2011 [retrieved on Mar. 25, 2019]. Retrieved from Internet URL: https://www.emvco.com/wp-content/uploads/2017/05/EMV_v4.3_Book_2_Security_and_Key_Management_20120607061923900.pdf, 174 pages.

Author Unknown, "NFC Guide: All You Need to Know About Near Field Communication", Square Guide [online] 2018 [retrieved on Nov. 13, 2018]. Retrieved from Internet URL: https://squareup.com/guides/nfc, 8 pages.

(56) References Cited

OTHER PUBLICATIONS

Profis, S., "Everything you need to know about NFC and mobile payments" CNET Directory [online], 2014 [retrieved on Mar. 25, 2019]. Retrieved from the Internet URL: https://www.cnet.com/how-to/how-nfc-works-and-mobile-payments/, 6 pages.
Cozma, N., "Copy data from other devices in Android 5.0 Lollipop setup", CNET Directory [online] 2014 [retrieved on Mar. 25, 2019]. Retrieved from the Internet URL: https://www.cnet.com/how-to/copy-data-from-other-devices-in-android-5-0-lollipop-setup/, 5 pages.
Kevin, Android Enthusiast, "How to copy text string from nfc tag", StackExchange [online] 2013 [retrieved on Mar. 25, 2019]. Retrieved from the Internet URL: https://android.stackexchange.com/questions/55689/how-to-copy-text-string-from-nfc-tag, 11 pages.
Author Unknown, "Tap & Go Device Setup", Samsung [online] date unknown [retrieved on Mar. 25, 2019]. Retrieved from the Internet URL: https://www.samsung.com/us/switch-me/switch-to-the-galaxy-s-5/app/partial/setup-device/tap-go.html, 1 page.
Author Unknown, "Multiple encryption", Wikipedia [online] 2019 [retrieved on Mar. 25, 2019]. Retrieved from Internet URL: https://en.wikipedia.org/wiki/Multiple_encryption, 4 pages.
Krawczyk, et al., "HMAC: Keyed-Hashing for Message Authentication", Network Working Group RFC:2104 memo [online] 1997 [retrieved on Mar. 25, 2019]. Retrieved from Internet URL: https://tools.ietf.org/html/rfc2104, 12 pages.
Song, et al., " The AES-CMAC Algorithm", Network Working Group RFC: 4493 memo [online] 2006 [retrieved on Mar. 25, 2019]. Retrieved from Internet URL: https://tools.ietf.org/html/rfc4493, 21 pages.
Katz, J. and Lindell, Y., "Aggregate Message Authentication Codes", Topics in Cryptology [online] 2008 [retrieved on Mar. 25, 2019]. Retrieved from Internet URL: https://www.cs.umd.edu/~jkatz/papers/aggregateMAC.pdf, 11 pages.
Adams, D., and Maier, A-K., "Goldbug Big Seven open source crypto-messengers to be compared—or: Comprehensive Confidentiality Review & Audit of GoldBug Encrypting E-Mail-Client & Secure Instant Messenger", Big Seven Study 2016 [online] [retrieved on Mar. 25, 2018]. Retrieved from Internet URL: https://sf.net/projects/goldbug/files/bigseven-crypto-audit.pdf, 309 pages.
Author Unknown, "Triple DES", Wikipedia [online] 2018 [retrieved on Mar. 25, 2019]. Retrieved from Internet URL: https://simple.wikipedia.org/wiki/Triple_DES, 2 pages.
Song F., and Yun, A.I., "Quantum Security of NMAC and Related Constructions—PRF domain extension against quantum attacks", IACR Cryptology ePrint Archive [online] 2017 [retrieved on Mar. 25, 2019]. Retrieved from Internet URL: https://eprint.iacr.org/2017/509.pdf, 41 pages.
Saxena, N., "Lecture 10: NMAC, HMAC and Number Theory", CS 6903 Modern Cryptography [online] 2008 [retrieved on Mar. 25, 2019]. Retrieved from Internet URL: http://isis.poly.edu/courses/cs6903/Lectures/lecture10.pdf, 8 pages.
Berg, G., "Fundamentals of EMV", Smart Card Alliance [online] date unknown [retrieved on Mar. 27, 2019]. Retrieveed from Internet URL: https://www.securetechalliance.org/resources/media/scap13_preconference/02.pdf, 37 pages.
Pierce, K., "Is the amazon echo nfc compatible?", Amazon.com Customer Q&A [online] 2016 [retrieved on Mar. 26, 2019]. Retrieved from Internet URL: https://www.amazon.com/ask/questions/Tx1RJXYSPE6XLJD?_encodi . . . , 2 pages.
Author Unknown, "Multi-Factor Authentication", idaptive [online] 2019 [retrieved on Mar. 25, 2019]. Retrieved from Internet URL: https://www.centrify.com/products/application-services/adaptive-multi-factor-authentication/risk-based-mfa/, 10 pages.
Author Unknown, "Adaptive Authentication", SecureAuth [online] 2019 [retrieved on Mar. 25, 2019}. Retrieved from Internet URL: https://www.secureauth.com/products/access-management/adaptive-authentication, 7 pages.
Van den Breekel, J., et al., "EMV in a nutshell", Technical Report, 2016 [retrieved on Mar. 25, 2019]. Retrieved from Internet URL: https://www.cs.ru.nl/E.Poll/papers/EMVtechreport.pdf, 37 pages.
Author Unknown, "Autofill", Computer Hope [online] 2018 [retrieved on Mar. 25, 2019]. Retrieved from Internet URL: https://www.computerhope.com/jargon/a/autofill.htm, 2 pages.
Author Unknown, "Fill out forms automatically", Google Chrome Help [online] 2019 [retrieved on Mar. 25, 2019]. Retrieved from Internet URL: https://support.google.com/chrome/answer/142893?co=GENIE.Platform%3DDesktop&hl=en, 3 pages.
Author Unknown, "Autofill credit cards, contacts, and passwords in Safari on Mac", Apple Safari User Guide [online] 2019 [retrieved on Mar. 25, 2019]. Retrieved from Internet URL: https://support.apple.com/guide/safari/use-autofill-ibrw1103/mac, 3 pages.
Menghin, M.J., "Power Optimization Techniques for Near Field Communication Systems", 2014 Dissertation at Technical University of Graz [online]. Retrieved from Internet URL: https://diglib.tugraz.at/download.php?id=576a7b910d2d6&location=browse, 135 pages.
Mareli, M., et al., "Experimental evaluation of NFC reliability between an RFID tag and a smartphone", Conference paper (2013) IEEE AFRICON At Mauritius [online] [retrieved on Mar. 25, 2019]. Retrieved from Internet URL: https://core.ac.uk/download/pdf/54204839.pdf, 5 pages.
Davison, A., et al., "MonoSLAM: Real-Time Single Camera SLAM", IEEE Transactions on Pattern Analysis and Machine Intelligence 29(6): 1052-1067 (2007).
Barba, R., "Sharing your location with your bank sounds creepy, but it's also useful", Bankrate, LLC [online] 2017 [retrieved on Mar. 25, 2019]. Retrieved from Internet URL: https://www.bankrate.com/banking/banking-app-location-sharing/, 6 pages.
Author Unknown: "onetappayment™", [online] Jan. 24, 2019, [retrieved on Mar. 25, 2019]. Retrieved from Internet URL: https://www.payubiz.in/onetap, 4 pages.
Vu, et al., "Distinguishing users with capacitive touch communication", Proceedings of the Annual International Conference on Mobile Computing and Networking, 2012, MOBICOM. 10.1145/2348543.2348569.
Pourghomi, P., et al., "A Proposed NFC Payment Application," International Journal of Advanced Computer Science and Applications, 4(8):173-181 (2013).
Author unknown, "EMV Card Personalization Specification", EMVCo., LLC., specification version 1.0, (2003) 81 pages.
Ullmann et al., "On-Card" User Authentication for Contactless Smart Cards based on Gesture Recognition, paper presentation LNI proceedings, (2012) 12 pages.
Faraj, S.T., et al., "Investigation of Java Smart Card Technology for Multi-Task Applications", J of Al-Anbar University for Pure Science, 2(1):23 pages (2008).
Dhamdhere, P., "Key Benefits of a Unified Platform for Loyalty, Referral Marketing, and UGC" Annex Cloud [online] May 19, 2017 [retrieved on Jul. 3, 2019]. Retrieved from Internet URL: https://www.annexcloude.com/blog/benefits-unified-platform/, 13 pages.
Author Unknown, "Global expansion of card tapping mobile OTP for security and convenience is imminent," Jun. 28, 2022, website: https://www.swidch.com/blogs/card-tapping-motp-blog.
Emvco: "EMV Card Personalisation Specification", Aug. 1, 2021, pp. 1-114, Retrieved from the Internet: URL: https://www.emvco.com/specification/?post_id=12467.
Saush, "Getting information from an EMV chip card with Java," Sep. 8, 2006, WordPress, pp. 1-13.
Smart Card Alliance, "Co-Branded Multi-Application Contactless Cards for Transit and Financial Payment," A Smart Card Alliance Transportation Council White Paper (40 pages), Mar. 2008.

* cited by examiner

100

SERVER-SIDE REDIRECT OF UNIFORM RESOURCE LOCATOR GENERATED BY CONTACTLESS CARD

BACKGROUND

Contactless cards may include logic to generate and/or store uniform resource locators (URLs). However, contactless cards may have limited resources compared to other computing devices. As such, there may be a limit to the number of different URLs a given contactless card can generate and/or store. Furthermore, the logic of the contactless card may need to be updated periodically. This may pose challenges, as the number of contactless cards may number in the thousands, millions, or more.

SUMMARY

Systems, methods, apparatuses, and computer-readable media for server-side redirect of uniform resource locators (URLs) generated by contactless cards. In one aspect, a server may receive, from a client device, a first hypertext transfer protocol (HTTP) request comprising a uniform resource locator (URL), where a first parameter of the URL includes a cryptogram generated by a contactless card and a second parameter of the URL includes a customer identifier of an account associated with the contactless card. The server may decrypt the cryptogram and determine a context of the account based on one or more attributes of the account. The server may select, based on the decryption of the cryptogram and the determined context of the account, a first redirect URL of a plurality of redirect URLs. The server may transmit, to the client device, an HTTP response including the redirect URL. The server may receive, from the client device, a second HTTP request including the redirect URL. The server may transmit, to the client device, an HTTP response including a resource at the redirect URL.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1A:
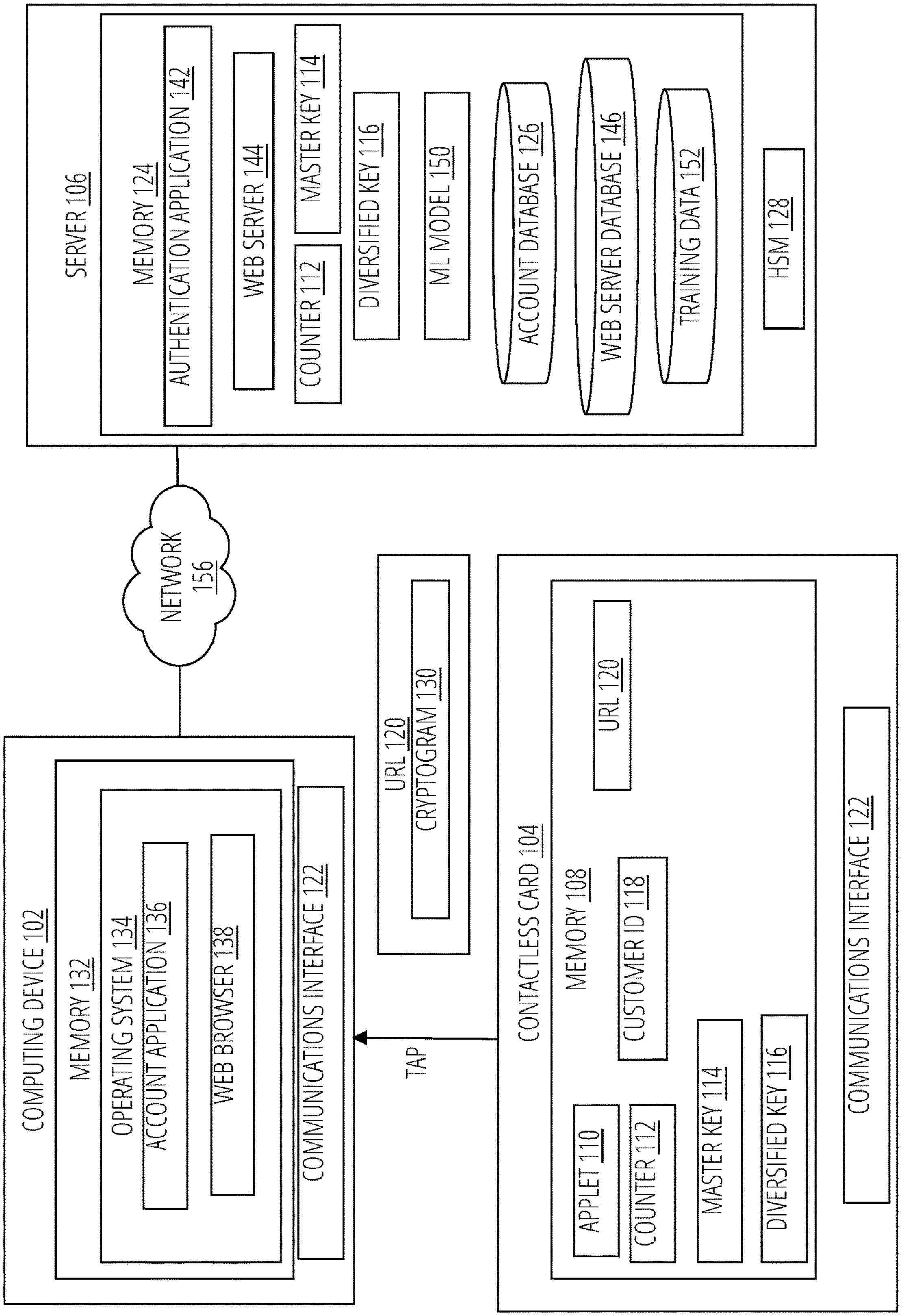
FIG. 1A illustrates an aspect of the subject matter in accordance with one embodiment.

Embodiments disclosed herein provide techniques for secure server-side redirection of URLs generated by contactless cards. Generally, a user may tap a contactless card to a computing device, thereby bringing the card within wireless communications range of the computing device. In response, the contactless card may generate a uniform resource locator (URL) that includes a cryptogram as a first parameter and a customer identifier as a second parameters. The computing device 102 may receive the URL, which may cause the computing device to open an application. The application may transmit the URL to an authentication server for processing. The server may attempt to decrypt the cryptogram. If the server is able to decrypt the cryptogram, the server may determine a redirect URL based on a context of an account associated with the card. The context may be determined based at least in part on one or more attributes of the account associated with the card. The server may determine the one or more attributes based on the customer ID specified in the URL. The server may transmit the redirect URL to the computing device, which causes the application to request and load the resource specified at the redirect URL.

In some embodiments, a machine learning (ML) model may be used to select the redirect URL and/or determine the context of the account. Generally, the ML model may be trained based on training data. The training data may describe redirect URLs selected for a received URL generated by a plurality of contactless cards 104 based on different account contexts and/or account attributes. Doing so may improve the accuracy in selecting redirect URLs relative to selecting redirect URLs without using machine learning.

Advantageously, embodiments disclosed herein provide secure, server-side redirect of URLs generated by contactless cards. By leveraging cryptograms generated by contactless cards, embodiments of the disclosure may securely verify the identity of the user with minimal risk of fraudulent activity. Furthermore, doing so ensures that redirect operations are only performed when the user has access to a contactless card that facilitates the cryptogram verification with the server. Furthermore, by providing the server-side redirect logic, fewer resources are needed in the contactless cards, thereby improving performance and reducing costs of the contactless cards. For example, the contactless card may not have enough storage and/or processing resources to have a one-to-one relationship between URLs and available web resources. However, by configuring the contactless card to generate a limited number of URLs that can be redirected by the server based on context, the contactless card can support a one-to-many relationship between URLs and available web resources. Furthermore, doing so may remove the need to periodically update the logic in the contactless card to support new URLs, e.g., as new web resources are added, removed, and/or modified.

With general reference to notations and nomenclature used herein, one or more portions of the detailed description which follows may be presented in terms of program procedures executed on a computer or network of computers. These procedural descriptions and representations are used by those skilled in the art to most effectively convey the substances of their work to others skilled in the art. A procedure is here, and generally, conceived to be a self-consistent sequence of operations leading to a desired result. These operations are those requiring physical manipulations of physical quantities. Usually, though not necessarily, these quantities take the form of electrical, magnetic, or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, these manipulations are often referred to in terms, such as adding or comparing, which are commonly associated with mental operations performed by a human operator. However, no such capability of a human operator is necessary, or desirable in most cases, in any of the operations described herein that form part of one or more embodiments. Rather, these operations are machine operations. Useful machines for performing operations of various embodiments include digital computers as selectively activated or configured by a computer program stored within that is written in accordance with the teachings herein, and/or include apparatus specially constructed for the required purpose or a digital computer. Various embodiments also relate to apparatus or systems for performing these operations. These apparatuses may be specially constructed for the required purpose. The required structure for a variety of these machines will be apparent from the description given.

Reference is now made to the drawings, wherein like reference numerals are used to refer to like elements throughout. In the following description, for the purpose of explanation, numerous specific details are set forth in order to provide a thorough understanding thereof. It may be evident, however, that the novel embodiments can be practiced without these specific details. In other instances, well-known structures and devices are shown in block diagram form in order to facilitate a description thereof. The intention is to cover all modification, equivalents, and alternatives within the scope of the claims.

FIG. 1A depicts an exemplary computing architecture 100, also referred to as a system, consistent with disclosed embodiments. Although the computing architecture 100 shown in FIGS. 1A-1E has a limited number of elements in a certain topology, it may be appreciated that the computing architecture 100 may include more or less elements in alternate topologies as desired for a given implementation.

The computing architecture 100 comprises one or more computing devices 102, one or more servers 106, and one or more contactless cards 104. The contactless card 104 is representative of any type of card, such as a credit card, debit card, ATM card, gift card, payment card, smart card, and the like. The contactless card 104 may comprise one or more communications interfaces 122, such as a radio frequency identification (RFID) chip, configured to communicate with a communications interface 122 (also referred to herein as a "card reader", a "wireless card reader", and/or a "wireless communications interface") of the computing devices 102 via NFC, the EMV standard, or other short-range protocols in wireless communication. Although NFC is used as an example communications protocol herein, the disclosure is equally applicable to other types of wireless communications, such as the EMV standard, Bluetooth, and/or Wi-Fi.

The computing device 102 is representative of any number and type of computing device, such as smartphones, tablet computers, wearable devices, laptops, portable gaming devices, virtualized computing system, merchant terminals, point-of-sale systems, servers, desktop computers, and the like. A mobile device may be used as an example of the computing device 102 but should not be considered limiting of the disclosure. The server 106 is representative of any type of computing device, such as a server, workstation, compute cluster, cloud computing platform, virtualized computing system, and the like. Although not depicted for the sake of clarity, the computing device 102, contactless card 104, and server 106 each include one or more processor circuits to execute programs, code, and/or instructions.

As shown, a memory 108 of the contactless card 104 includes an applet 110, a counter 112, a master key 114, a diversified key 116, a unique customer identifier (ID) 118, and one or more URLs 120. The applet 110 is executable code configured to perform the operations described herein. The counter 112, master key 114, diversified key 116, and customer ID 118 are used to provide security in the system 100 as described in greater detail below.

As shown, a memory 132 of the computing device 102 includes an instance of an operating system 134. Example operating systems include the Android® OS, iOS®, macOS®, Linux®, and Windows® operating systems. As shown, the operating system 134 includes an account application 136 and a web browser 138. The account application 136 allows users to perform various account-related operations, such as activating payment cards, viewing account balances, purchasing items, processing payments, and the like. In some embodiments, a user may authenticate using authentication credentials to access certain features of the account application 136. For example, the authentication credentials may include a username (or login) and password, biometric credentials (e.g., fingerprints, Face ID, etc.), and the like. The web browser 138 is an application that allows the computing device 102 to access information via the network 156 (e.g., via the Internet). For example, using the web browser 138, the user may access one or more resources in the web server database 146 of the server 106. The resources may include pages for activating contactless cards 104, viewing account balances, purchasing items, processing payments, onboarding experiences for newly activated contactless cards 104, and the like. Similar to the account application 136, the user may authenticate using authentication credentials prior to accessing such web pages.

As shown, a memory 124 of the server 106 includes an authentication application 142, a machine learning (ML) model 150, and a web server 144. Although depicted as separate components of the server 106, in some embodiments, the authentication application 142, ML model 150, and/or the web server 144 may be integrated into a single component. Furthermore, the authentication application 142, ML model 150, and/or the authentication application 142 may be implemented in hardware, software, and/or a combination of hardware and software. The memory 124 further includes an account database 126, the web server database 146, and a data store of training data 152. The account database 126 generally includes information related to an account holder (e.g., one or more users), one or more accounts of the account holder, and one or more contactless cards 104 of the account.

In some embodiments, a user may need to perform an operation and/or access a resource in the web server database 146. For example, the user may need to activate the contactless card 104 from an inactive payment state to an active payment state such that the contactless card 104 may be used to process payments. As another example, the user may need customer support, e.g., when unable to access their account via the account application 136, when a purchase using the contactless card 104 is declined, etc. Often, many resources in the web server database 146 may assist the user to perform any requested operations and/or receive assistance. However, because there may be any number of resources in the web server database 146, the contactless card 104 may not have sufficient resources to store a URL 120 for each resource in the web server database 146. As another example, the contactless card 104 may not have been updated to reflect the most recent state of the resources in the web server database 146. Advantageously, the system 100 implements secure server-side redirect of URLs 120 generated by the contactless cards 104.

In the embodiment depicted in FIG. 1A, the user may tap the contactless card 104 to the computing device 102 (or otherwise bring the contactless card 104 within communications range of the communications interface 122 of the device 102). The applet 110 of the contactless card 104 may then generate a URL 120 that is directed to a resource, such as the server 106, the authentication application 142, web server 144, and/or a resource in the web server database 146. In some embodiments, the URL 120 is a generic URL that may be interpreted by the server 106 to determine a particular resource in the web server database 146. Stated differently, the server 106 may need to identify a redirect URL for the generic URL 120 and return the redirect URL to the computing device 102 such that the computing device 102 can access the resource at the redirect URL. Therefore, in such embodiments, the URL 120 may be directed to a redirect component of the server 106, e.g., a page and/or application that handles redirects as described herein. In some embodiments, the applet 110 constructs the URL 120 according to one or more rules. In some embodiments, the contactless card 104 stores a plurality of generic URLs 120 and the applet 103 selects the URL 120 from the plurality of URLs 120 based on one or more rules. In some embodiments, the applet 110 may generate the URL 120 by selecting a URLs 120 and adding dynamic data, such as a cryptogram 130, as one or more parameters of the URL.

The cryptogram 130 may be based on the customer ID 118 of the contactless card 104. The cryptogram 130 may be generated based on any suitable cryptographic technique. In some embodiments, the applet 110 may include the URL 120, the cryptogram 130, and an unencrypted identifier (e.g., the customer ID 118, an identifier of the contactless card 104, and/or any other unique identifier) as part of a data package. In at least one embodiment, the data package is an NDEF file.

As stated, the computing architecture 100 is configured to implement key diversification to secure data, which may be referred to as a key diversification technique herein. Generally, the server 106 (or another computing device) and the contactless card 104 may be provisioned with the same master key 114 (also referred to as a master symmetric key). More specifically, each contactless card 104 is programmed with a distinct master key 114 that has a corresponding pair in the server 106. For example, when a contactless card 104 is manufactured, a unique master key 114 may be programmed into the memory 108 of the contactless card 104. Similarly, the unique master key 114 may be stored in a record of a customer associated with the contactless card 104 in the account database 126 of the server 106 (and/or stored in a different secure location, such as the hardware security module (HSM) 128). The master key 114 may be kept secret from all parties other than the contactless card 104 and server 106, thereby enhancing security of the system 100. In some embodiments, the applet 110 of the contactless card 104 may encrypt and/or decrypt data (e.g., the customer ID 118) using the master key 114 and the data as input a cryptographic algorithm. For example, encrypting the customer ID 118 with the master key 114 may result in the cryptogram 130. Similarly, the server 106 may encrypt and/or decrypt data associated with the contactless card 104 using the corresponding master key 114.

In other embodiments, the master keys 114 of the contactless card 104 and server 106 may be used in conjunction with the counters 112 to enhance security using key diversification. The counters 112 comprise values that are synchronized between the contactless card 104 and server 106. The counter 112 may comprise a number that changes each time data is exchanged between the contactless card 104 and the server 106 (and/or the contactless card 104 and the computing device 102). When preparing to send data (e.g., to the server 106 and/or the device 102), the applet 110 of the contactless card 104 may increment the counter 112. The applet 110 of the contactless card 104 may then provide the master key 114 and counter 112 as input to a cryptographic algorithm, which produces a diversified key 116 as output. The cryptographic algorithm may include encryption algorithms, hash-based message authentication code (HMAC) algorithms, cipher-based message authentication code (CMAC) algorithms, and the like. Non-limiting examples of the cryptographic algorithm may include a symmetric encryption algorithm such as 3DES or AES107; a symmetric HMAC algorithm, such as HMAC-SHA-256; and a symmetric CMAC algorithm such as AES-CMAC. Examples of key diversification techniques are described in greater detail in U.S. patent application Ser. No. 16/205,119, filed Nov. 29, 2018. The aforementioned patent application is incorporated by reference herein in its entirety.

Continuing with the key diversification example, the applet 110 may then encrypt the data (e.g., the customer ID 118 and/or any other data) using the diversified key 116 and the data as input to the cryptographic algorithm. For example, encrypting the customer ID 118 with the diversified key 116 may result in an encrypted customer ID (e.g., a cryptogram 130). In some embodiments, the cryptogram 130 is included in as a parameter of the URL 120. In other embodiments, the cryptogram 130 is not a parameter of the URL 120 but is transmitted with the URL 120 in a data package such as an NDEF file. The authentication application 142 may then read the data package including the URL 120 and cryptogram 130 via the communications interface 122 of the computing device 102.

As stated, the cryptogram 130 and the customer ID 118 may be parameters of the URL 120. For example, the URL 120 may be "http://www.example.com/redirect?param=ABC123&custID=123". In such an example, the cryptogram 130 may correspond to the parameter "ABC123" and the customer ID 118 may correspond to the parameter "custID". Once received by the operating system 134, the operating system 134 may open an application to process the URL 120. In some embodiments, the URL 120 may be registered with the account application 136, which causes the operating system 134 to launch the account application 136 and provide the URL 120 as input to the account application 136. However, in other examples, the operating system 134 may launch the web browser 138 and provide the URL 120 as input to the web browser 138.

Regardless of the entity launched by the operating system 134, the account application 136 and/or web browser 138 may generate a hypertext transfer protocol (HTTP) request that includes the URL 120. For the sake of clarity, the embodiments of FIGS. 1A-1E are discussed using the account application 136 as a reference example. However, the embodiments are equally applicable to the web browser 138, and the use of the account application 136 should not be considered limiting of the disclosure.

Figure 1B:
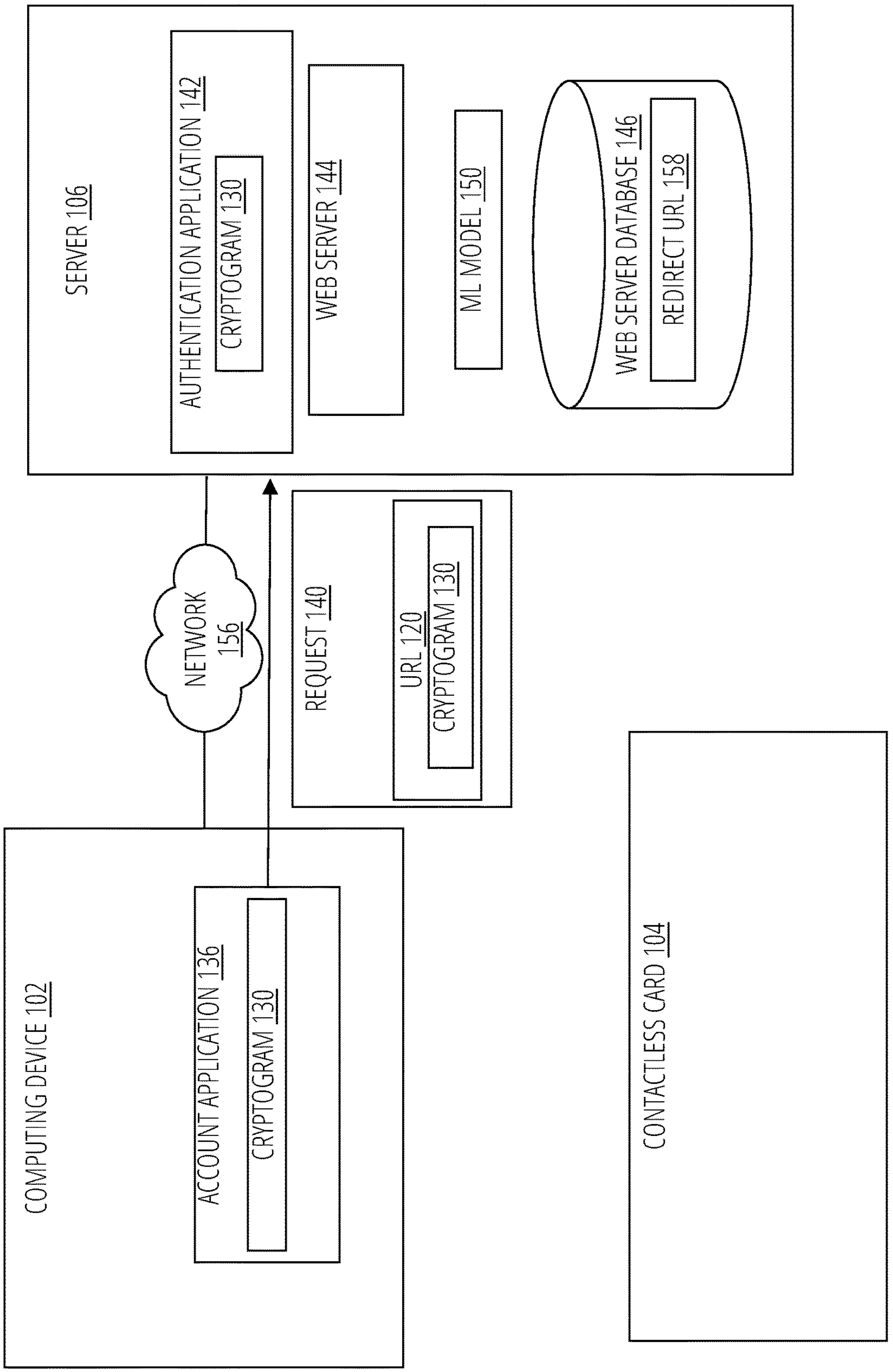
FIG. 1B illustrates an aspect of the subject matter in accordance with one embodiment.

FIG. 1B depicts an embodiment where the account application 136 transmits an HTTP request 140 comprising the cryptogram 130 and the unencrypted customer ID 118 to the server 106. The web server 144 may generally receive the HTTP request 140 and provide the cryptogram 130 to the authentication application 142 for verification. For example, the authentication application 142 may attempt to decrypt the cryptogram 130 using a copy of the master key 114 stored by the server 106. In some embodiments, the authentication application 142 may identify the master key 114 and counter 112 using the unencrypted customer ID 118 (or other identifier) provided by the account application 136 to the server 106. In some examples, the authentication application 142 may provide the master key 114 and counter 112 as input to the cryptographic algorithm, which produces a diversified key 116 as output. The resulting diversified key 116 may correspond to the diversified key 116 of the contactless card 104, which may be used to decrypt the cryptogram 130.

Regardless of the decryption technique used, the authentication application 142 may successfully decrypt the cryptogram 130, thereby verifying or authenticating the cryptogram 130 in the request 140 (e.g., by comparing the customer ID 118 that is produced by decrypting the cryptogram 130 to a known customer ID stored in the account database 126, and/or based on an indication that the decryption using the master key 114 and/or diversified key 116 was successful). Although the keys 114, 116 are depicted as being stored in the memory 124, the keys may be stored elsewhere, such as in a secure element and/or the HSM 128. In such embodiments, the secure element and/or the HSM 128 may decrypt the cryptogram 130 using the master key 114 and/or diversified key 116 and a cryptographic function. Similarly, the secure element and/or HSM 128 may generate the diversified key 116 based on the master key 114 and counter 112 as described above.

If the decryption is successful, the authentication application 142, web server 144, and/or the ML model 150 may determine a context of the account associated with the contactless card 104. The context of the account may be based on one or more attributes of the account. The one or more attributes may include any metadata for the account holder, the account, and/or the contactless card 104 in the account database 126. Example attributes include, but are not limited to, an amount of time the account has been open, a payment state of the contactless card 104, an age of the contactless card 104, a balance of the account, a balance of the contactless card 104, and recent events associated with the account and/or contactless card 104. The events may include any type of event, such as a declined transaction, approved transaction, transaction history, activation of the contactless card, mailing (but not activation) of the contactless card 104 to the customer, etc. The context may further be determined based on an analysis of the request 140, e.g., an application that transmitted the request, metadata of the request, etc. For example, if the account application 136 generates the request 140, the account application 136 may include some metadata that allows the server 106 to determine the context. The metadata may include a current page of the account application 136 that was displayed on the computing device 102 when the contactless card 104 was tapped to the computing device 102. Embodiments are not limited in this context.

Based on the context, a resource from the web server database 146 may be selected for the server-side redirect of the URL 120. For example, as stated, the URL 120 may be a generic URL that is directed to a redirect resource of the server 106. By determining the context, a specific resource in the web server database 146 may be identified, and a redirect URL directed to the identified resource may be returned to the computing device 102. For example, if the user cannot activate their contactless card 104, the server 106 may determine to select a card activation web page from the web server database 146 and transmit a URL to the card activation web page to the computing device 102.

In some embodiments, the ML model 150 may determine the context and/or select a resource from the web server database 146 for the redirect. Generally, the ML model 150 is representative of any type of computing model. The ML model 150 may be trained to determine contexts and select resources for redirection based on the training data 152. The training data 152 includes data to train the ML model 150. For example, the training data 152 may include data describing a plurality of accounts, attributes of each account, attributes of one or more contactless cards 104 associated with each account, contexts of the accounts, and one or more redirect URLs selected for the account based on receiving a request from a client device associated with each account, where the request specifies a URL such as the URL 120, e.g., a generic URL generated by a contactless card 104 that needs interpretation and redirect by the server 106. The redirect includes determination of a context of the account and selection of a redirect URL directed to a specific resource. Stated differently, the training data 152 includes a plurality of redirect URLs to be selected based on a plurality of URLs 120, one or more attributes of the accounts, attributes of the contactless cards 104, and/or contexts of the accounts and/or contactless cards 104. In some embodiments, the training data 152 generally includes data reflecting different times in a life cycle of an account (and/or contactless card 104) that certain account-related operations occur. Therefore, based on the training, the ML model 150 may accurately determine contexts of the accounts and/or accurately select resources in the web server database 146 as resources for redirect operations based on the stage of the life cycle of the account (and/or contactless card 104). Stated differently, the trained ML model 150 may predict what the customer is trying to do when tapping their contactless cards 104 to a computing device 102. Once trained, the ML model 150 selects redirect URLs for a URL 120 generated by the contactless cards 104 based on the prediction of what the customer is trying to do.

Returning to the decryption, if the authentication application 142 is unable to decrypt the cryptogram 130 to yield the expected result (e.g., the customer ID 118 of the account associated with the contactless card 104), the authentication application 142 does not validate the cryptogram 130. In such an example, the authentication application 142 determines to refrain from determining the context of the account and/or selecting a redirect URL. The authentication application 142 may transmit an indication of the failed decryption to the computing device 102.

Figure 1C:
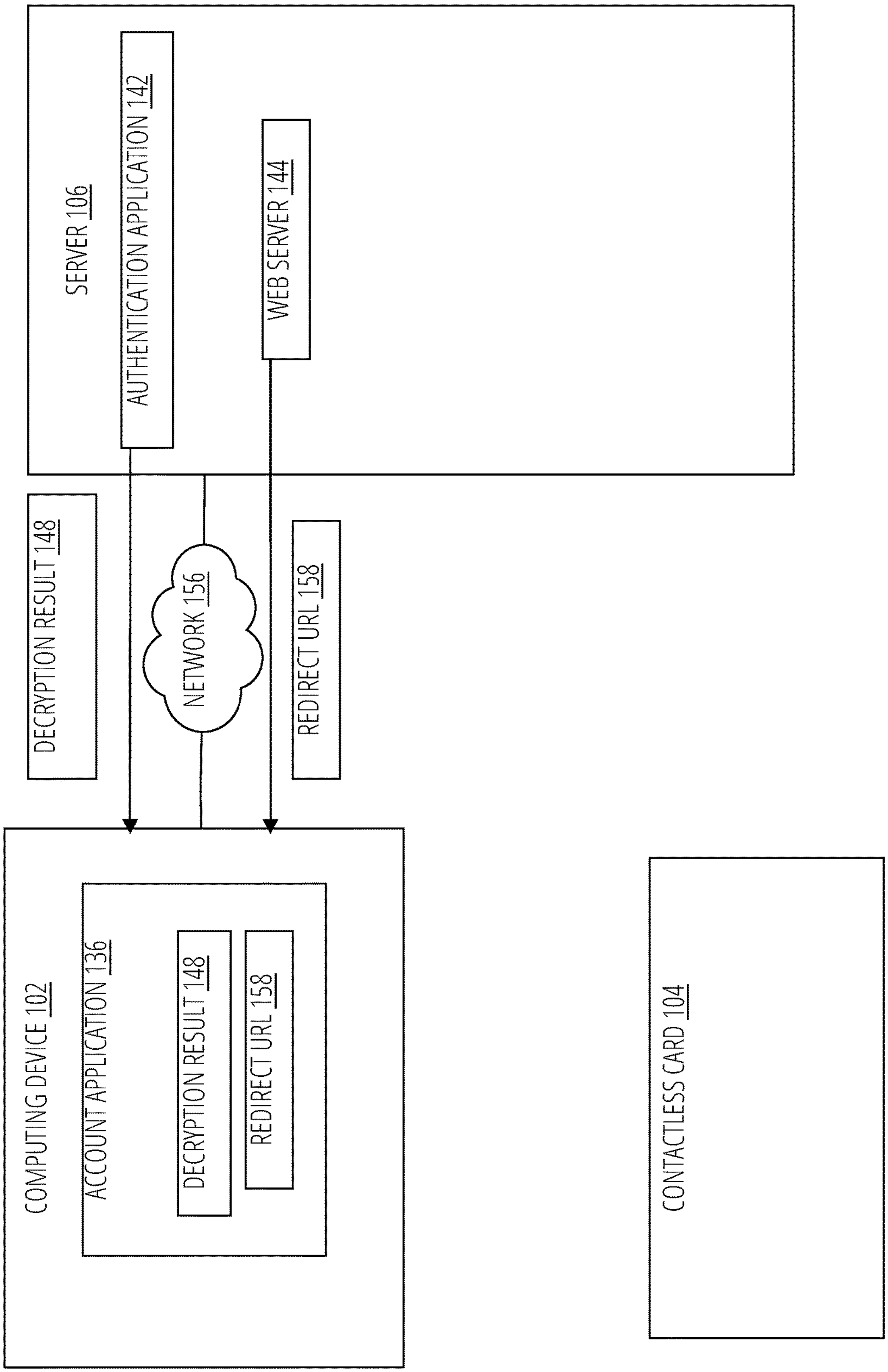
FIG. 1C illustrates an aspect of the subject matter in accordance with one embodiment.

FIG. 1C depicts an embodiment where the authentication application 142 selects and transmits a redirect URL 158 to the computing device 102 based on successfully decrypting the cryptogram 130 and determining the context of the account. For example, if the context indicates the user is unable to activate the contactless card 104, the redirect URL 158 may be directed to a help webpage in the web server database 146 to assist users attempting to activate the contactless card 104. The redirect URL 158 may be included in an HTTP response (not pictured). In some embodiments, the HTTP response includes an HTTP response status code with a location header field, where the redirect URLs 158 is specified as at least a portion of the location header field. The HTTP response may include any suitable HTTP status code that includes a location header field. Examples of HTTP status codes that include location header fields include, but are not limited to, the HTTP 301 status code, HTTP 302 status code, HTTP 303 status code, HTTP 307 status code, HTTP 308 status code, and the like. However, in other embodiments, the redirect URL 158 is transmitted according to a different format and/or protocol. In some embodiments, the redirect URL 158 includes one or more additional parameters, such as an authentication token and/or an identifier of a page of the account application 136 to be opened responsive to receiving the redirect URL 158.

As stated, the authentication application 142 may generate an authentication token to be included as a parameter of the redirect URL 158. The authentication token may be generated responsive to the decryption of the cryptogram 130. In some embodiments, the authentication application 142 further generates the authentication token based on a determination that the account associated with the contactless card 104 has been active for a period of time that exceeds a time threshold (e.g., 1 month, 3 months, etc.). As another example, the authentication application 142 may further generate the authentication token based on a device identifier of the computing device 102, received from the account application 136 and/or web browser 138, matching a device identifier associated with the account in the account database 126. The device identifier may be any unique identifier, such as a media access control (MAC) address of the computing device 102, a unique alphanumeric string, and the like. Stated differently, if the device identifier matches the stored identifier in the account database 126, the computing device 102 may be a "trusted" device, and the authentication application 142 may generate the authentication token based on the computing device 102 being a trusted device.

The authentication token may generally allow the account application 136 to log into the account associated with the contactless card 104 in the account database 126. In some embodiments, the authentication token includes a hash value and one or more attributes of the account. For example, the account application 136 may extract the authentication token. The account application 136 may then use the token to access the account, e.g., by verifying the token locally and/or transmitting the authentication token to the server 106. For example, the server 106 may compare the authentication token received from the account application 136 to the account token generated by the authentication application 142. If the comparison results in a match, the server 106 may transmit one or more attributes of the account in the account database 126 to the account application 136, which may process and/or otherwise display the one or more attributes on the computing device 102.

As shown, the authentication application 142 may further transmit a decryption result 148 to the computing device 102. The decryption result 148 generally reflects whether or not the cryptogram 130 was decrypted, e.g., with a flag, bit, or any other suitable indication. In the example depicted in FIG. 1C, the decryption result 148 may indicate the server 106 decrypted the cryptogram 130. Doing so may allow the account application 136 to determine that the cryptogram 130 was successfully decrypted prior to following the redirect URL 158, thereby improving security. The account application 136 and/or the web browser 138 may receive the redirect URL 158 and/or the decryption result 148. In at least one embodiment, the account application 136 and/or web browser 138 automatically follows the redirect URL 158 upon receipt, e.g., by generating a new request comprising the redirect URL 158.

Figure 1D:
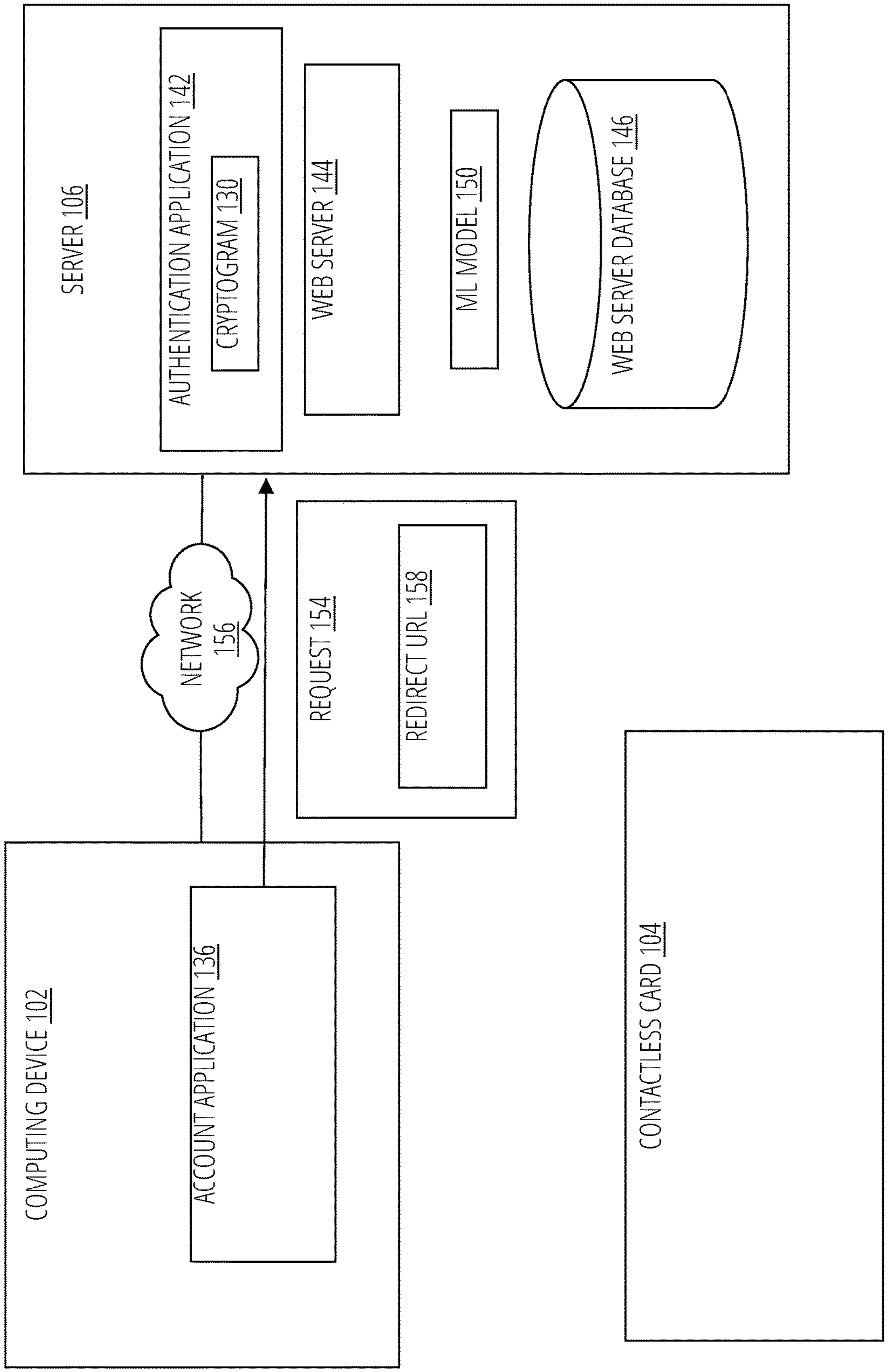
FIG. 1D illustrates an aspect of the subject matter in accordance with one embodiment.

FIG. 1D depicts an embodiment where the account application 136 transmits a request 154 comprising the redirect URL 158 to the server 106. Once received, the web server 144 may identify a resource in the web server database 146 associated with the redirect URL 158. For example, the resource in the web server database 146 may include the help page for activating the contactless card. Embodiments are not limited in this context. If the redirect URL 158 includes an authentication token and/or page identifier, the account application 136 may extract the token for account authentication purposes and/or open the page of the account application 136 associated with the page identifier. In some embodiments, the account application 136 may decode the authentication token to identify one or more attributes of the account in the account database 126.

Figure 1E:
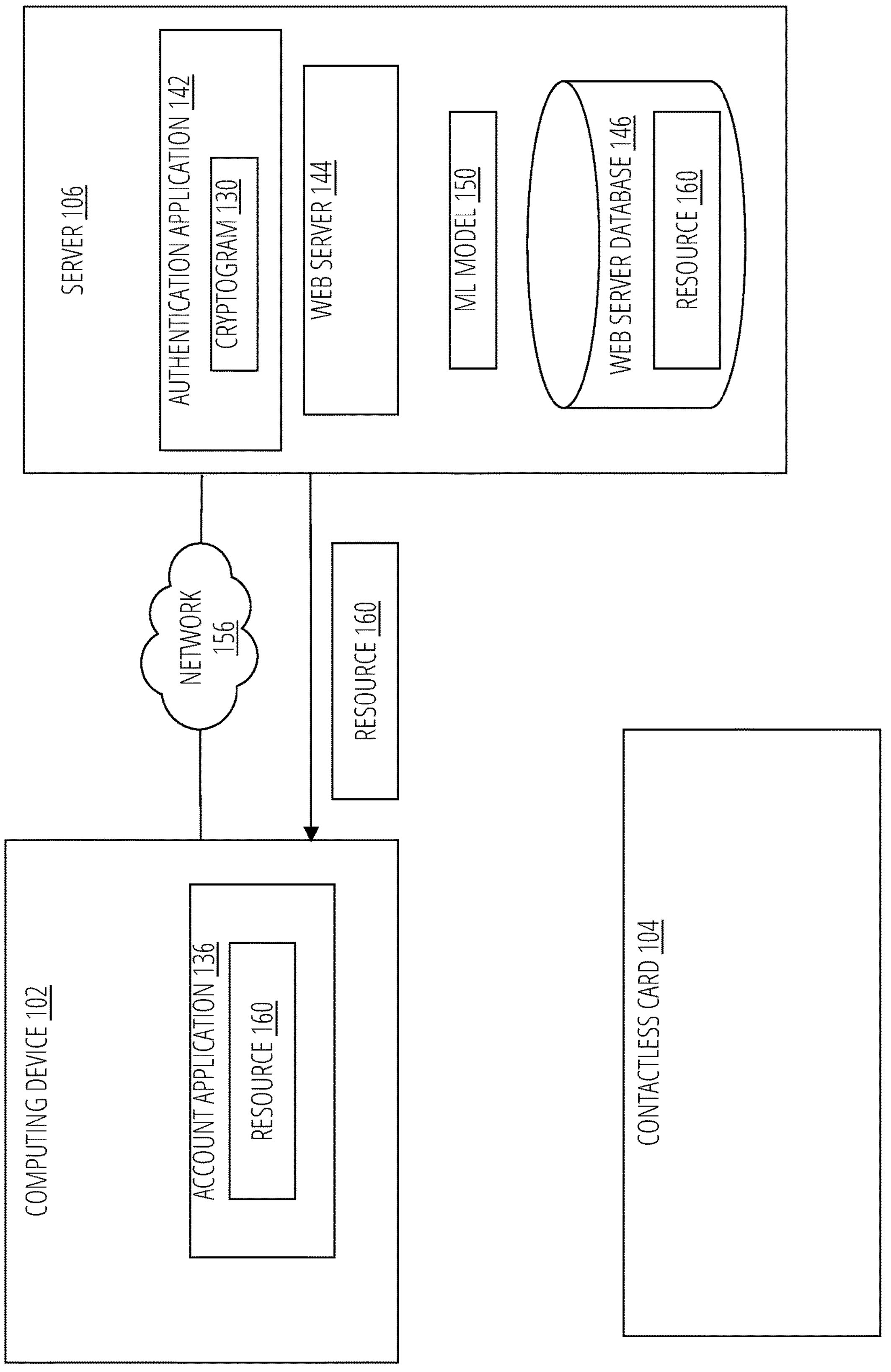
FIG. 1E illustrates an aspect of the subject matter in accordance with one embodiment.

FIG. 1E depicts an embodiment where the web server 144 identifies a resource 160 associated with the redirect URL 158. The web server 144 may then transmit the resource 160 to the computing device 102. The resource 160 may be transmitted as part of an HTTP response. As shown, the account application 136 may then access the resource 160, thereby displaying the resource 160 on a display of the computing device 102. As stated, in some embodiments, the web browser 138 may receive and render the resource 160.

Advantageously, the system 100 provides server-side redirection of the URL 120 generated by the contactless card 104. Doing so improves the performance of the system 100. For example, the performance of the contactless card 104 may be improved by reducing the amount of processing resources and/or memory resources needed to generate and/or store URLs 120. Furthermore, by configuring the contactless card to generate a limited number of URLs 120 that can be redirected by the server 106 based on context, the contactless card 104 can support a one-to-many relationship between URLs and available resources in the web server database 146. Furthermore, doing so may remove the need to periodically update the logic in the contactless card 104 to support new URLs, e.g., as new web resources are added, removed, and/or modified. Similarly, by leveraging cryptograms 130 included in the URLs 120 by the contactless cards, the system 100 may securely verify the identity of the user with minimal risk of fraudulent activity. Furthermore, the system 100 ensures that redirect operations are only performed when the user has access to a contactless card that generates a valid cryptogram for verification by the server 106.

Figure 2A:
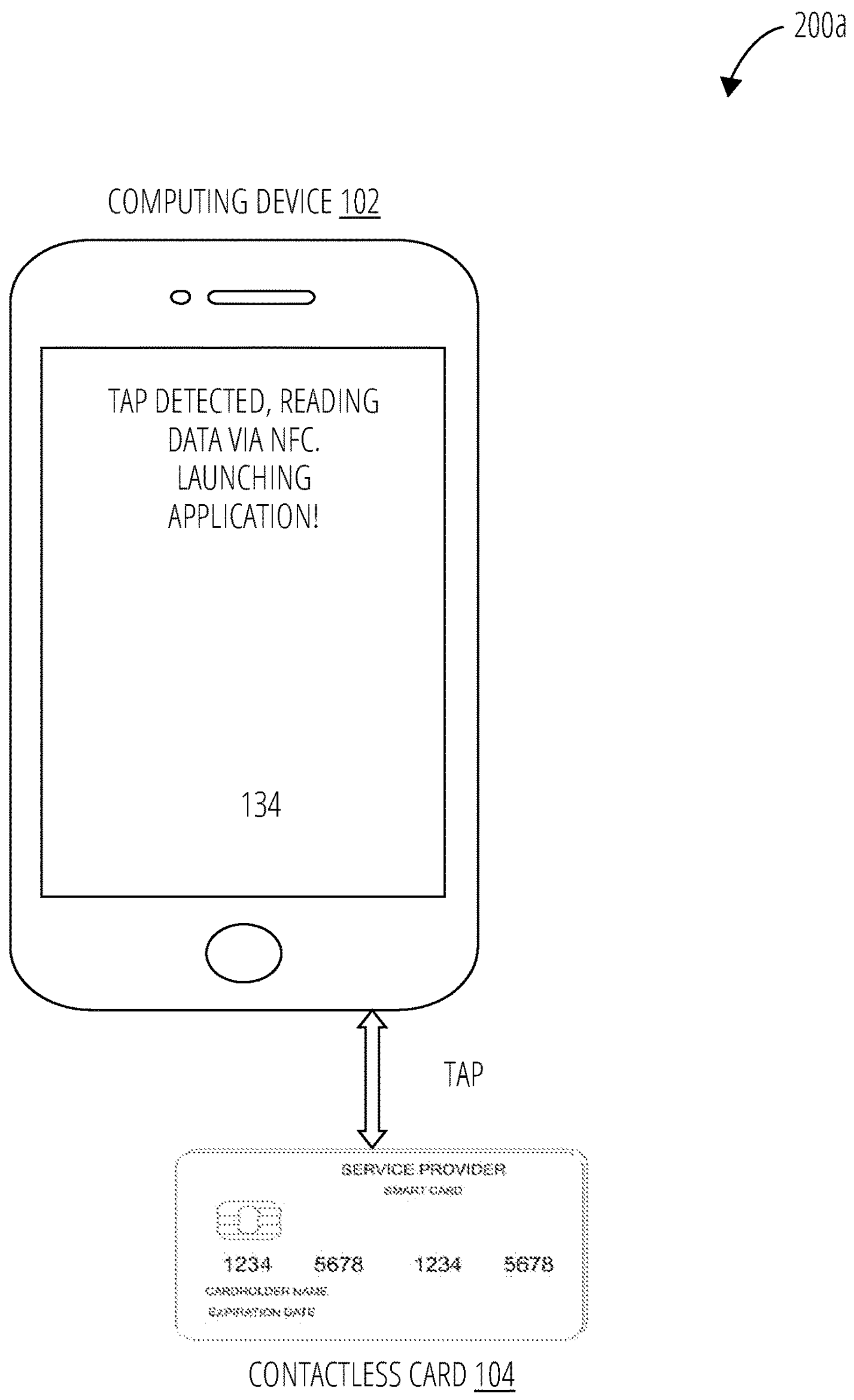
FIG. 2A illustrates an aspect of the subject matter in accordance with one embodiment.

FIG. 2A is a schematic 200*a* illustrating an embodiment where a contactless card 104 is tapped to a computing device 102. While the computing device 102 is depicted as outputting a screen (e.g., a home screen) of the operating system 134, the computing device 102 may generally be in any state. For example, the user may be using another application, such as the account application 136 and/or the web browser 138, when tapping the contactless card 104 to the computing device 102.

As stated, when the contactless card 104 is tapped to the computing device 102, the applet 110 may generate a cryptogram 130 and URL 120. In some embodiments, the cryptogram 130 is a parameter of the URL 120. The applet 110 may further include an identifier, such as an unencrypted customer ID 118, an identifier of the contactless card 104, and the like, as a parameter of the URL 120. Regardless of whether the cryptogram 130 and/or unencrypted identifier are parameters of the URL 120, the cryptogram 130, unencrypted identifier, and the URL 120 may be included in a data package, such as an NDEF file, that is read by the computing device 102. As shown, responsive to receiving the data package, the operating system 134 may launch an application, as the URL 120 (or a portion thereof) may be registered with the account application 136 and/or web browser 138.

Figure 2B:
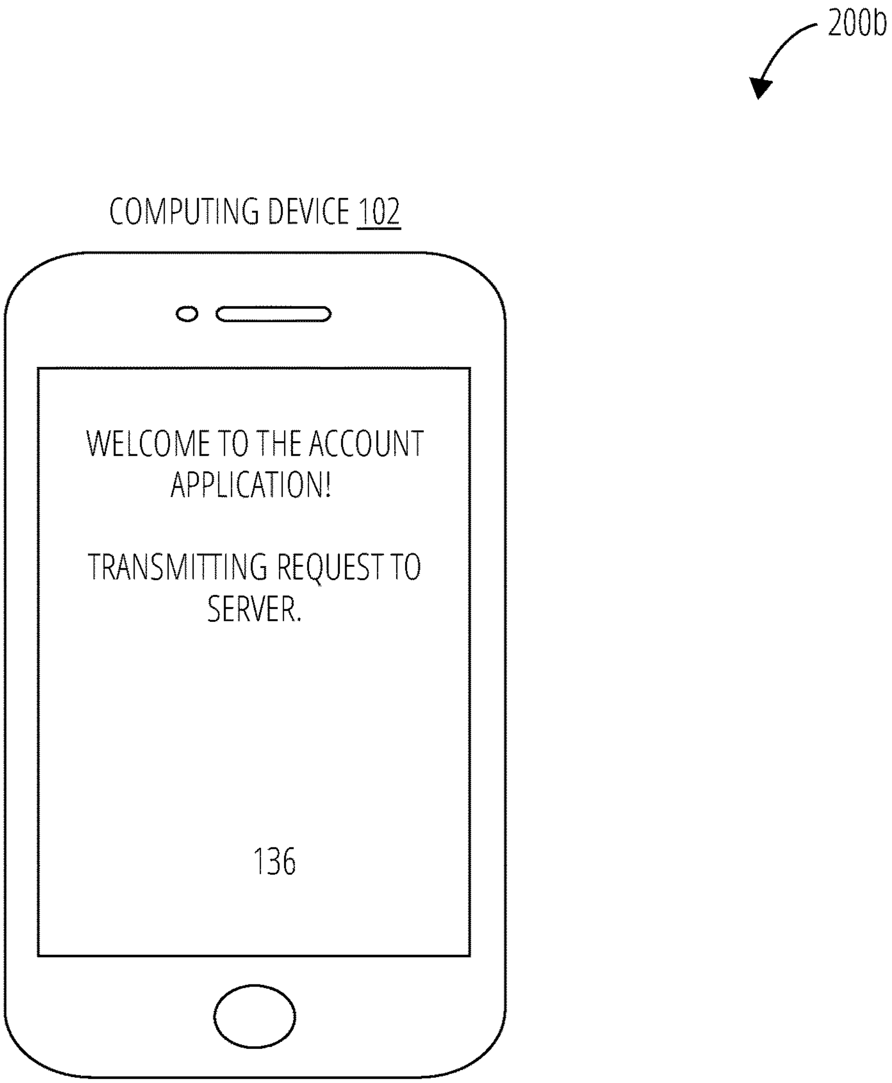
FIG. 2B illustrates an aspect of the subject matter in accordance with one embodiment.

FIG. 2B is a schematic 200*b* illustrating an embodiment where the account application 136 is opened responsive to the operating system 134 receiving the URL 120 from the contactless card 104. As shown, the account application 136 transmits the URL 120, cryptogram 130, and unencrypted customer ID 118 to the server 106. In at least one embodiment, the account application 136 transmits the URL 120, cryptogram 130, and customer ID 118 to the server 106 as at least a portion of a first HTTP request. The authentication application 142 may then attempt to decrypt the cryptogram 130 as described in greater detail above. If the decryption is successful, the authentication application 142 may instruct the ML model 150 to determine a context of the account associated with the customer ID 118 and output a redirect URL that is directed to a resource 160 in the web server database 146. The server 106 may then transmit the redirect URL 158 to the computing device 102.

In other embodiments, the ML model 150 may output the resource 160, and the web server 144 determines the redirect URL associated with the resource 160, e.g., based on a mapping of URLs to resources (not pictured) stored by the web server 144. In another embodiment, the ML model 150 may output the context, such as "account activation," "transaction declined," etc. The web browser 138 may then identify one or more resources 160 in the web server database 146 that are associated with the context, e.g., based on a mapping of contexts to resources (not pictured) stored by the web server 144. For example, a plurality of resources 160 may be associated with the "transaction declined" context generated by the ML model 150. In such an example, the web server 144 may select one of the plurality of resources and return a redirect URL 158 directed to the selected resource to the computing device 102.

Figure 2C:
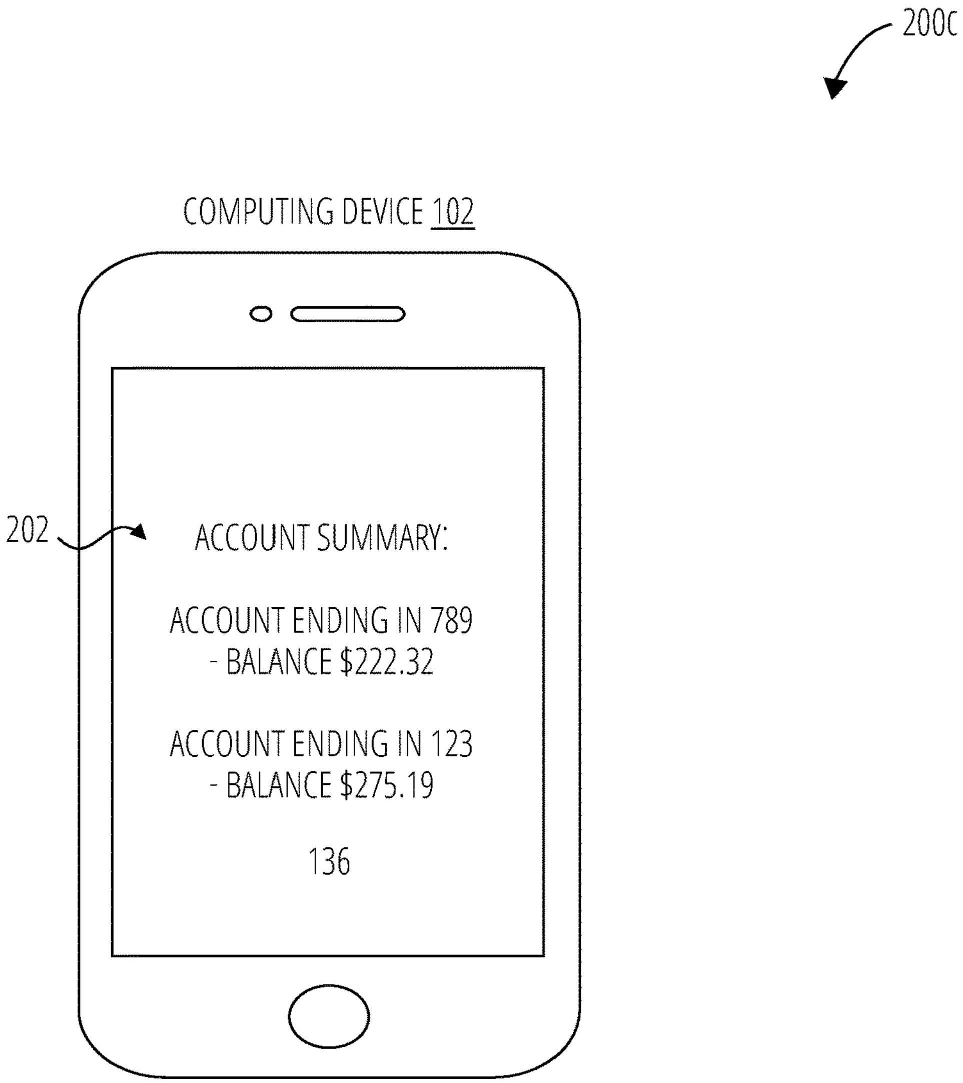
FIG. 2C illustrates an aspect of the subject matter in accordance with one embodiment.

FIG. 2C is a schematic 200*c* illustrating an embodiment where the account application 136 displays a page 202. The page 202 may correspond to a resource 160 associated with a redirect URL 158 received from the server 106 as described above with reference to FIG. 2B. Once received, the account application 136 may generate a new request specifying the redirect URL 158 and transmit the new request to the server 106. The server 106 may respond with the resource 160, e.g., the page 202. In some embodiments, however, the account application 136 may store the page 202 locally. In such embodiments, the account application 136 need not generate a new request for the page 202. Instead, the redirect URL 158 may include an identifier of the page 202, and the account application 136 may open the page 202 based on identifying the identifier of the page 202 in the redirect URL 158. Illustratively, as shown, the page 202 corresponds to an account detail page, where one or more attributes of one or more accounts are displayed on the computing device 102.

Operations for the disclosed embodiments may be further described with reference to the following figures. Some of the figures may include a logic flow. Although such figures presented herein may include a particular logic flow, it can be appreciated that the logic flow merely provides an example of how the general functionality as described herein can be implemented. Further, a given logic flow does not necessarily have to be executed in the order presented unless otherwise indicated. In addition, the given logic flow may be implemented by a hardware element, a software element executed by a processor, or any combination thereof. The embodiments are not limited in this context.

Figure 3:
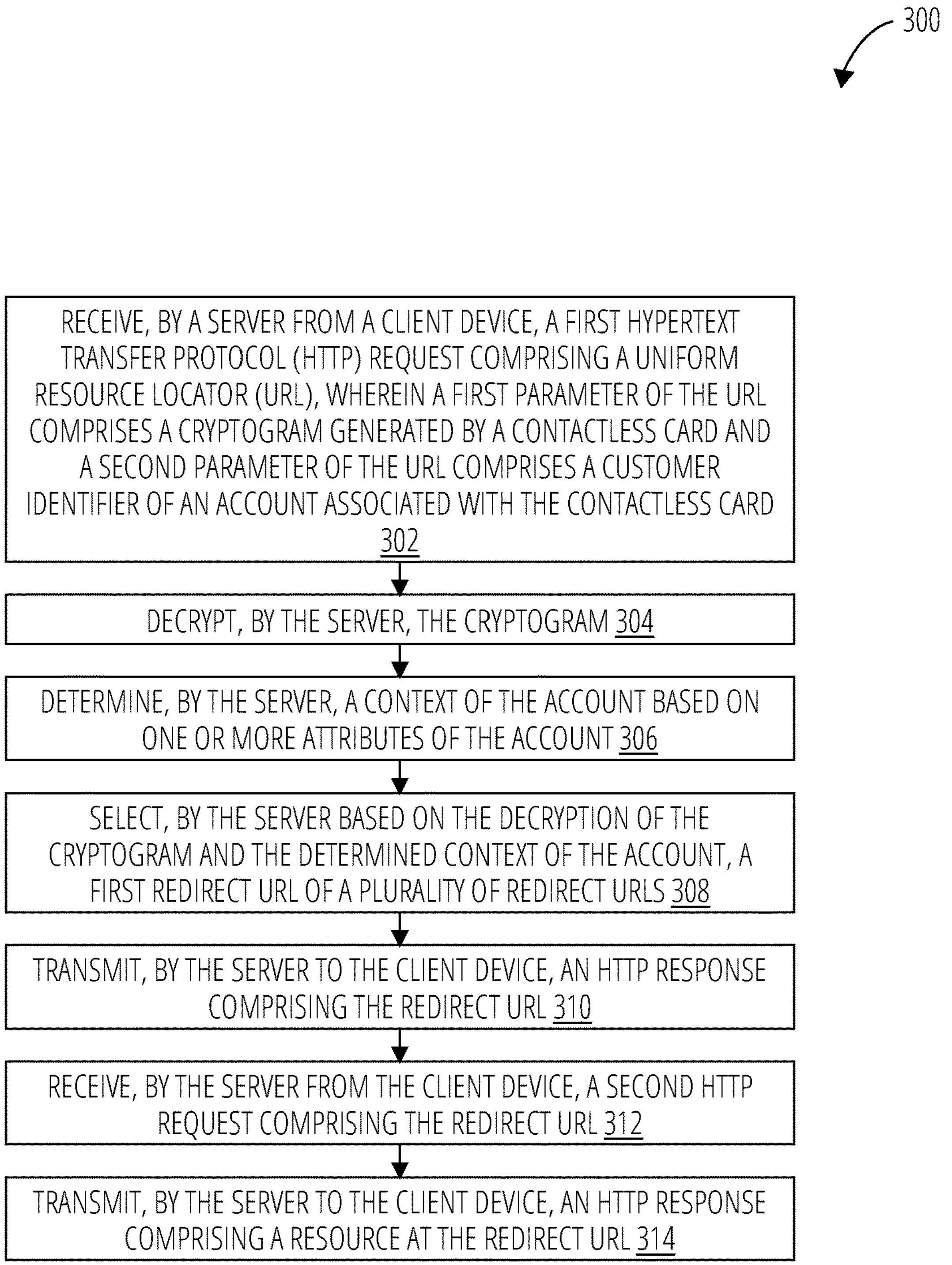
FIG. 3 illustrates a routine 300 in accordance with one embodiment.

FIG. 3 illustrates an embodiment of a logic flow, or routine, 300. The logic flow 300 may be representative of some or all of the operations executed by one or more embodiments described herein. For example, the logic flow 300 may include some or all of the operations for server-side redirect of a URL generated by a contactless card 104. Embodiments are not limited in this context.

In block 302, routine 300 receives, by a server 106 from a client computing device 102, a first hypertext transfer protocol (HTTP) request comprising a URL 120, wherein a first parameter of the URL 120 comprises a cryptogram 130 generated by a contactless card 104 and a second parameter of the URL 120 comprises a customer ID 118 of an account associated with the contactless card 104. In block 304, the routine 300 decrypts, by the server 106, the cryptogram 130. In block 306, routine 300 determines, by the server 106, a context of the account based on one or more attributes of the account. In at least one embodiment, the ML model 150 determines the context. In block 308, routine 300 selects, by the server 106 based on the decryption of the cryptogram and the determined context of the account, a first redirect URL 158 of a plurality of redirect URLs. In block 310, routine 300 transmits, by the server 106 to the computing device 102, an HTTP response comprising the redirect URL 158. In block 312, routine 300 receives, by the server 106 from the computing device 102, a second HTTP request comprising the redirect URL 158. In block 314, routine 300 transmits, by the server 106 to the computing device 102, an HTTP response comprising a resource 160 at the redirect URL 158.

Figure 4:
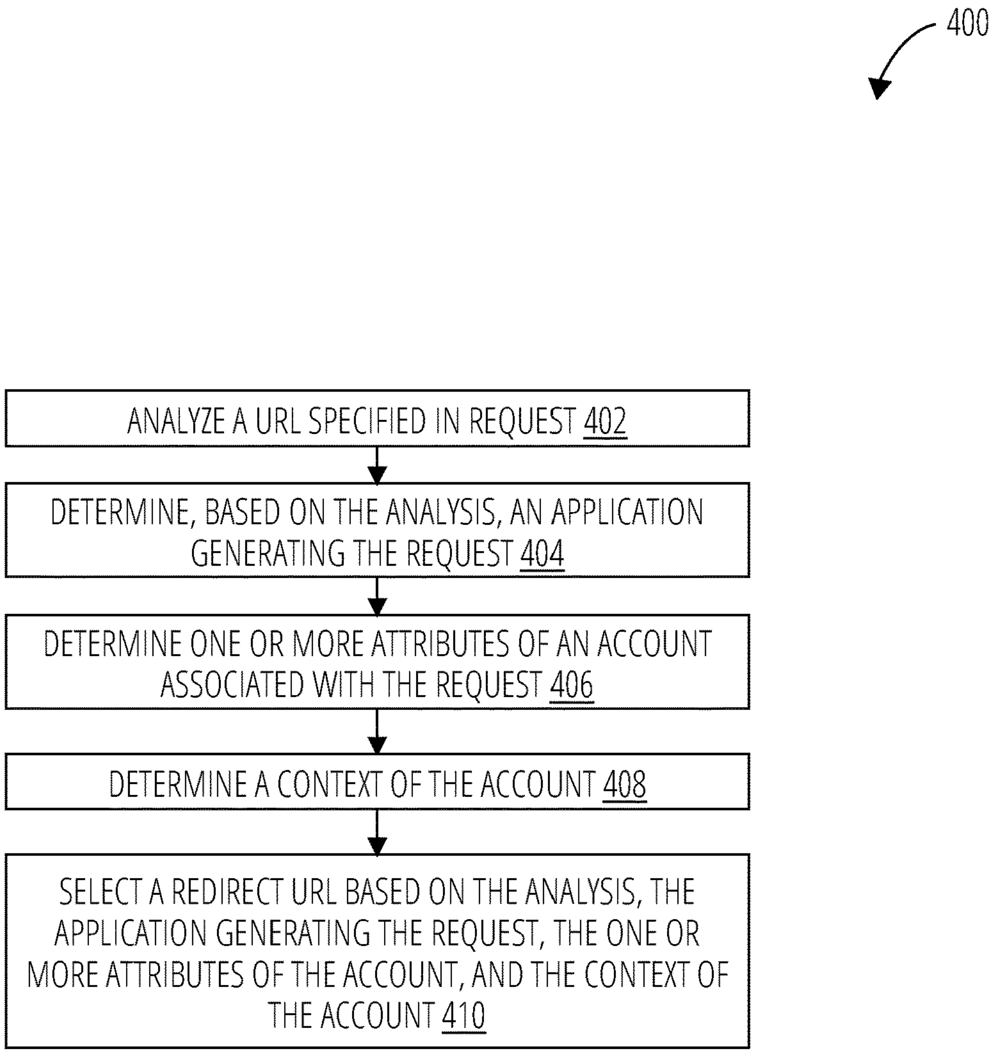
FIG. 4 illustrates a routine 400 in accordance with one embodiment.

FIG. 4 illustrates an embodiment of a logic flow, or routine, 400. The logic flow 400 may be representative of some or all of the operations executed by one or more embodiments described herein. For example, the logic flow 400 may include some or all of the operations for server-side redirect of a URL generated by a contactless card 104. Embodiments are not limited in this context.

In block 402, routine 400 analyzes, by the server 106, a URL specified in a request. For example, the URL may be the URL 120 comprising the cryptogram 130 received at block 302 of FIG. 3. In block 404, routine 400 determines, by the server 106, based on the analysis, an application generating the request. For example, the account application 136 and/or the web browser 138 may transmit the request, and the server 106 may determine that the account application 136 or the web browser 138 transmitted the request. In block 406, routine 400 determines, by the server 106, one or more attributes of an account associated with the request, e.g., based on the customer ID 118 in the request. In block 410, routine 400 selects a redirect URL 158 based on the analysis, the application generating the request, and the one or more attributes of the account. The redirect URL 158 may be transmitted to the computing device 102, which may follow the redirect URL 158 to load the corresponding resource 160.

Figure 5:
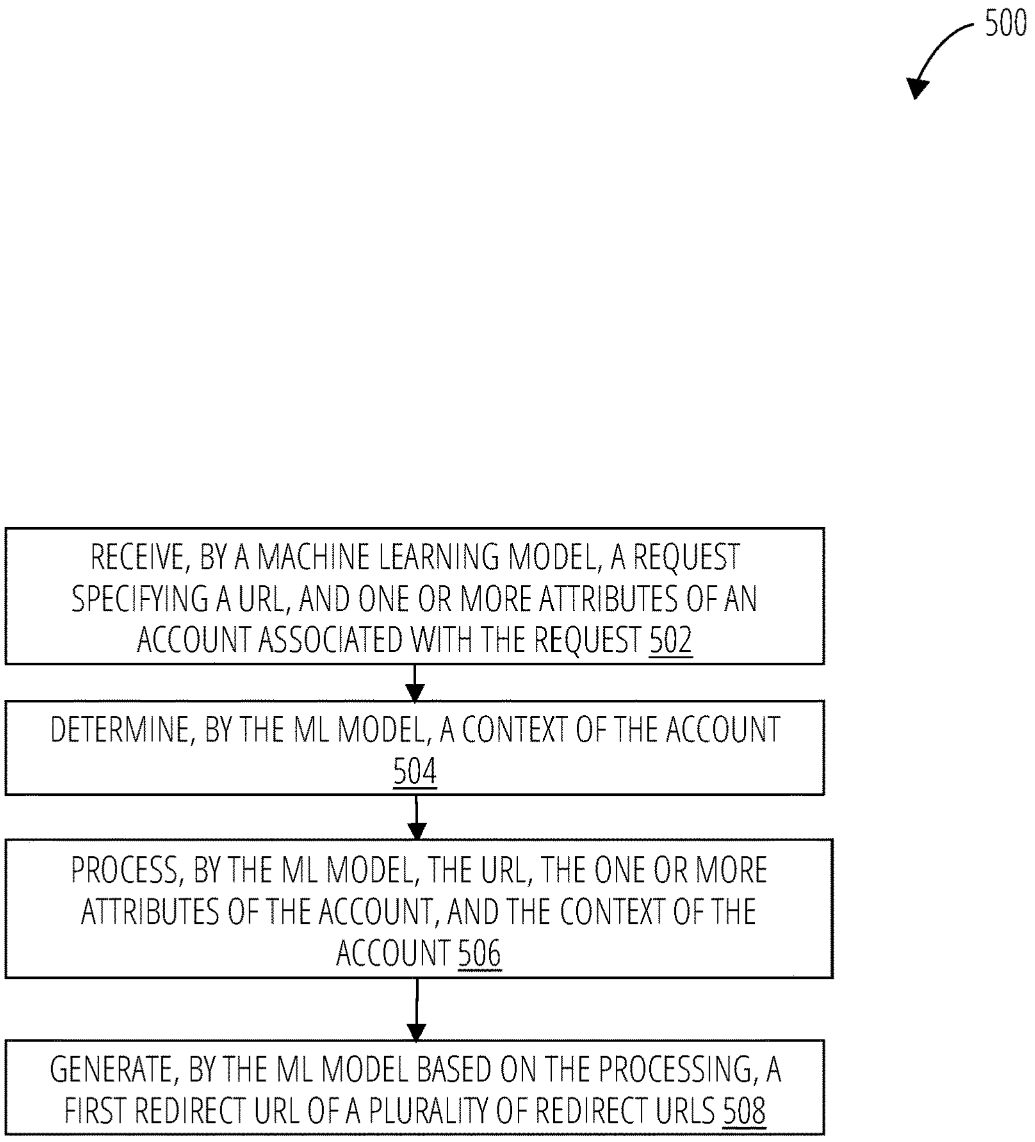
FIG. 5 illustrates a routine 500 in accordance with one embodiment.

FIG. 5 illustrates an embodiment of a logic flow, or routine, 500. The logic flow 500 may be representative of some or all of the operations executed by one or more embodiments described herein. For example, the logic flow 500 may include some or all of the operations for server-side redirect of a URL using machine learning, where the URL is generated by a contactless card 104. Embodiments are not limited in this context.

In block 502, routine 500 receives, by an ML model 150, a request specifying a URL, and one or more attributes of an account associated with the request. In block 504, routine 500 determines, by the ML model 150, a context of the account. At block 506, routine 500 processes, by the ML model 150, the URL, the one or more attributes of the account, and the context of the account. In block 508, routine 500 generates, by the ML model based on the processing, a first redirect URL 158 of a plurality of redirect URLs. The redirect URL 158 may be transmitted to the computing device 102, which may follow the redirect URL 158 to load the corresponding resource 160.

Figure 6A:
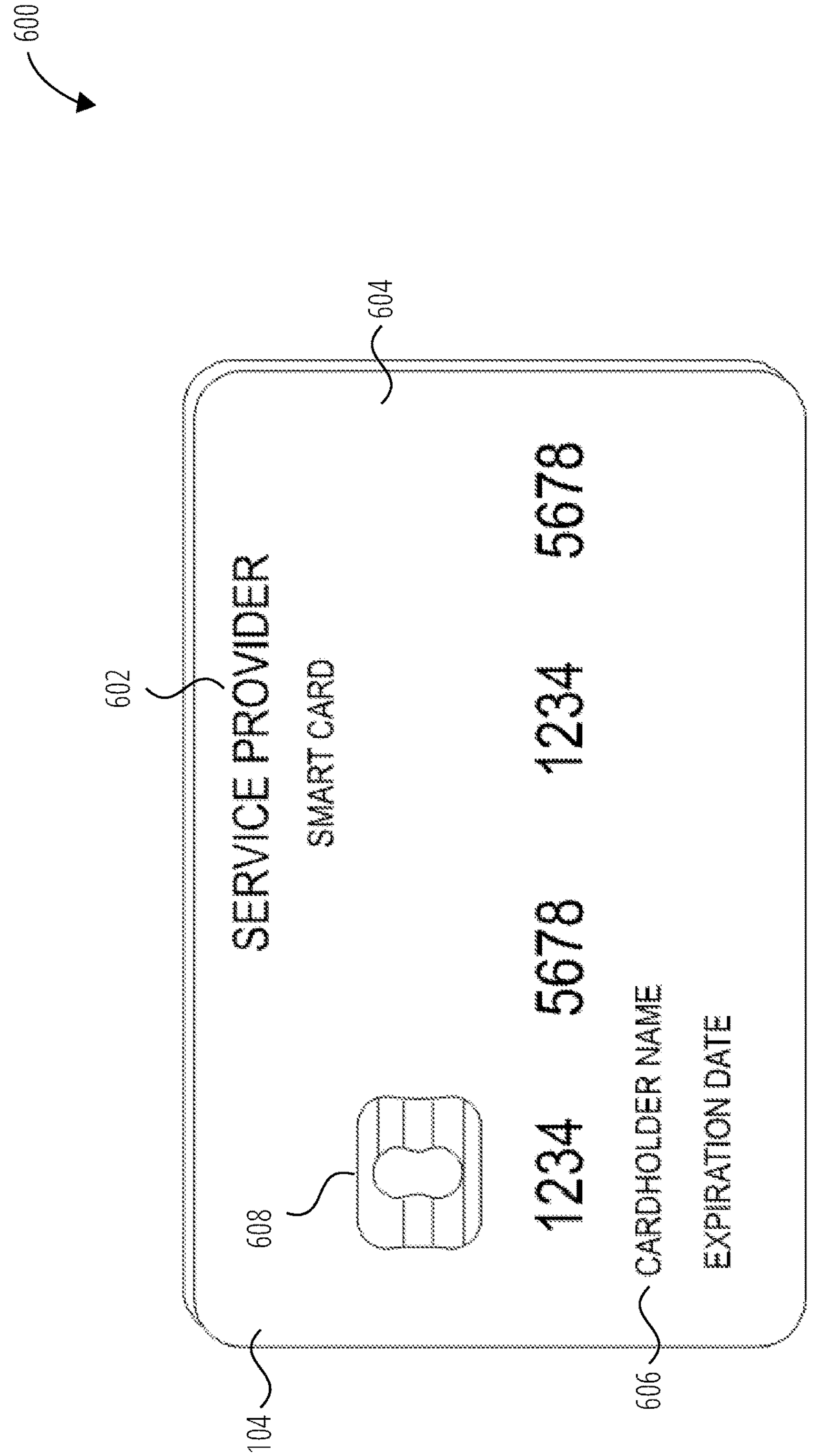
FIG. 6A illustrates a contactless card in accordance with one embodiment.

FIG. 6A is a schematic 600 illustrating an example configuration of a contactless card 104, which may include a payment card, such as a credit card, debit card, or gift card, issued by a service provider as displayed as service provider indicia 602 on the front or back of the contactless card 104. In some examples, the contactless card 104 is not related to a payment card, and may include, without limitation, an identification card. In some examples, the transaction card may include a dual interface contactless payment card, a rewards card, and so forth. The contactless card 104 may include a substrate 604, which may include a single layer, or one or more laminated layers composed of plastics, metals, and other materials. Exemplary substrate materials include polyvinyl chloride, polyvinyl chloride acetate, acrylonitrile butadiene styrene, polycarbonate, polyesters, anodized titanium, palladium, gold, carbon, paper, and biodegradable materials. In some examples, the contactless card 104 may have physical characteristics compliant with the ID-1 format of the ISO/IEC 7816 standard, and the transaction card may otherwise be compliant with the ISO/IEC 14443 standard. However, it is understood that the contactless card 104 according to the present disclosure may have different characteristics, and the present disclosure does not require a transaction card to be implemented in a payment card.

Figure 6B:
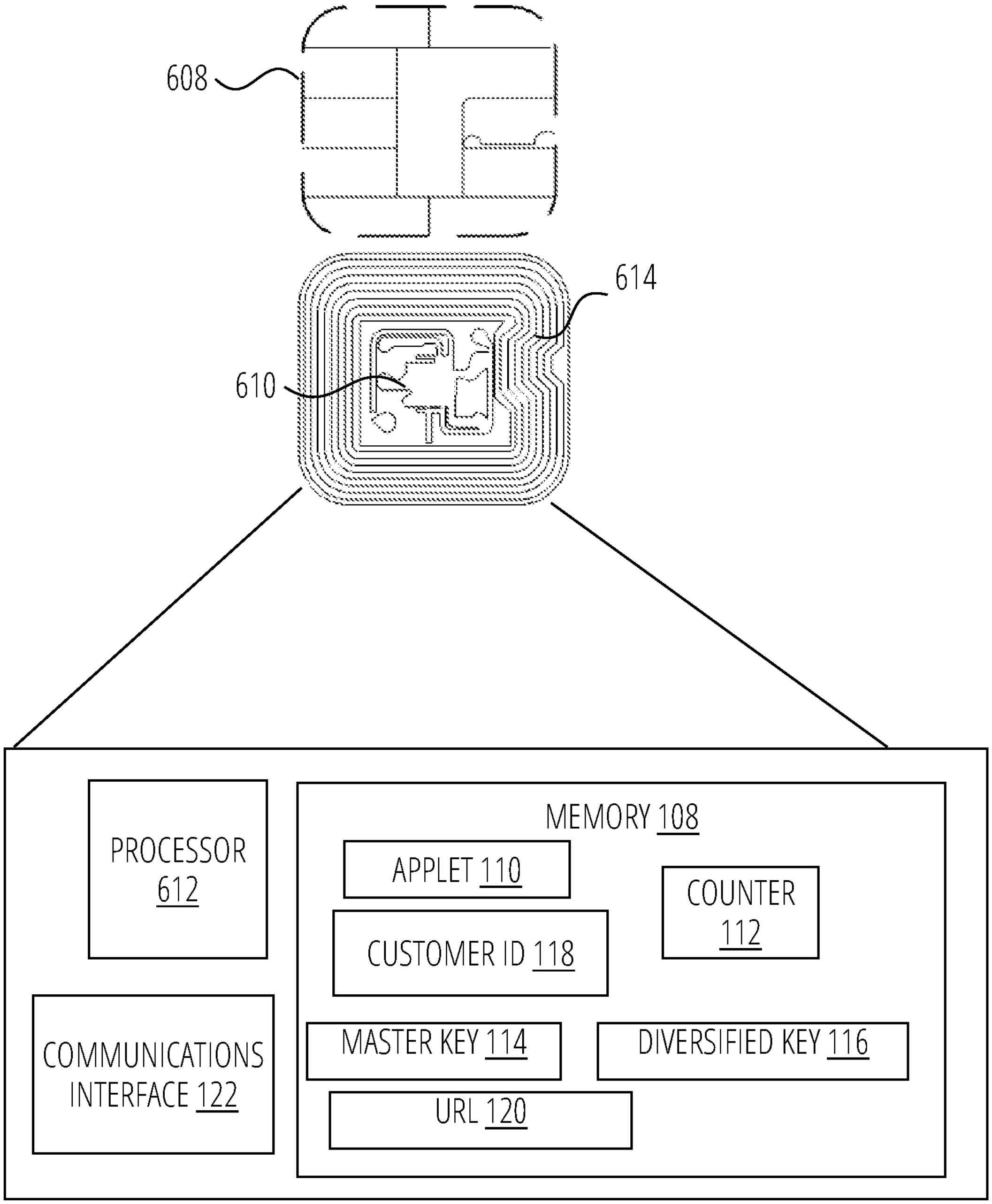
FIG. 6B illustrates a contactless card in accordance with one embodiment.

The contactless card 104 may also include identification information 606 displayed on the front and/or back of the card, and a contact pad 608. The contact pad 608 may include one or more pads and be configured to establish contact with another client device, such as an ATM, a user device, smartphone, laptop, desktop, or tablet computer via transaction cards. The contact pad may be designed in accordance with one or more standards, such as ISO/IEC 7816 standard, and enable communication in accordance with the EMV protocol. The contactless card 104 may also include processing circuitry, antenna and other components as will be further discussed in FIG. 6B. These components may be located behind the contact pad 608 or elsewhere on the substrate 604, e.g. within a different layer of the substrate 604, and may electrically and physically coupled with the contact pad 608. The contactless card 104 may also include a magnetic strip or tape, which may be located on the back of the card (not shown in FIG. 6A). The contactless card 104 may also include a Near-Field Communication (NFC) device coupled with an antenna capable of communicating via the NFC protocol. Embodiments are not limited in this manner.

As illustrated in FIG. 2, the contact pad 608 of contactless card 104 may include processing circuitry 610 for storing, processing, and communicating information, including a processor 612, a memory 108, and one or more communications interfaces 122. It is understood that the processing circuitry 610 may contain additional components, including processors, memories, error and parity/CRC checkers, data encoders, anticollision algorithms, controllers, command decoders, security primitives and tamperproofing hardware, as necessary to perform the functions described herein.

The memory 108 may be a read-only memory, write-once read-multiple memory or read/write memory, e.g., RAM, ROM, and EEPROM, and the contactless card 104 may include one or more of these memories. A read-only memory may be factory programmable as read-only or one-time programmable. One-time programmability provides the opportunity to write once then read many times. A write once/read-multiple memory may be programmed at a point in time after the memory chip has left the factory. Once the memory is programmed, it may not be rewritten, but it may be read many times. A read/write memory may be programmed and re-programed many times after leaving the factory. A read/write memory may also be read many times after leaving the factory. In some instances, the memory 108 may be encrypted memory utilizing an encryption algorithm executed by the processor 612 to encrypted data.

The memory 108 may be configured to store one or more applet 110, one or more counters 112, a customer ID 118, the master key 114, diversified key 116, and Redirect URLs 120. The one or more applet 110 may comprise one or more software applications configured to execute on one or more contactless cards, such as a Java® Card applet. However, it is understood that applet 110 are not limited to Java Card applets, and instead may be any software application operable on contactless cards or other devices having limited memory. The one or more counter 112 may comprise a numeric counter sufficient to store an integer. The customer ID 118 may comprise a unique alphanumeric identifier assigned to a user of the contactless card 104, and the identifier may distinguish the user of the contactless card from other contactless card users. In some examples, the customer ID 118 may identify both a customer and an account assigned to that customer and may further identify the contactless card 104 associated with the customer's account.

The processor 612 and memory elements of the foregoing exemplary embodiments are described with reference to the contact pad 608, but the present disclosure is not limited thereto. It is understood that these elements may be implemented outside of the contact pad 608 or entirely separate from it, or as further elements in addition to processor 612 and memory 108 elements located within the contact pad 608.

In some examples, the contactless card 104 may comprise one or more antenna(s) 614. The one or more antenna(s) 614 may be placed within the contactless card 104 and around the processing circuitry 610 of the contact pad 608. For example, the one or more antenna(s) 614 may be integral with the processing circuitry 610 and the one or more antenna(s) 614 may be used with an external booster coil. As another example, the one or more antenna(s) 614 may be external to the contact pad 608 and the processing circuitry 610.

In an embodiment, the coil of contactless card 104 may act as the secondary of an air core transformer. The terminal may communicate with the contactless card 104 by cutting power or amplitude modulation. The contactless card 104 may infer the data transmitted from the terminal using the gaps in the power connection of the contactless card 104, which may be functionally maintained through one or more capacitors. The contactless card 104 may communicate back by switching a load on the coil of the contactless card 104 or load modulation. Load modulation may be detected in the terminal's coil through interference. More generally, using the antenna(s) 614, processor 612, and/or the memory 108, the contactless card 104 provides a communications interface to communicate via NFC, Bluetooth, and/or Wi-Fi communications.

As explained above, contactless card 104 may be built on a software platform operable on smart cards or other devices having limited memory, such as JavaCard, and one or more or more applications or applets may be securely executed. Applet 110 may be added to contactless cards to provide a one-time password (OTP) for multifactor authentication (MFA) in various mobile application-based use cases. Applet 110 may be configured to respond to one or more requests, such as near field data exchange requests, from a reader, such as a mobile NFC reader (e.g., of a mobile computing device 102 or point-of-sale terminal), and produce an NDEF message that comprises a cryptographically secure OTP encoded as an NDEF text tag. The NDEF message may include the URL 120, the cryptogram 130, and any other data.

One example of an NDEF OTP is an NDEF short-record layout (SR=1). In such an example, one or more applet 110 may be configured to encode the OTP as an NDEF type 4 well known type text tag. In some examples, NDEF messages may comprise one or more records. The applet 110 may be configured to add one or more static tag records in addition to the OTP record.

In some examples, the one or more applet 110 may be configured to emulate an RFID tag. The RFID tag may include one or more polymorphic tags. In some examples, each time the tag is read, different cryptographic data is presented that may indicate the authenticity of the contactless card. Based on the one or more applet 110, an NFC read of the tag may be processed, the data may be transmitted to a server, such as a server of a banking system, and the data may be validated at the server.

In some examples, the contactless card 104 and server may include certain data such that the card may be properly identified. The contactless card 104 may include one or more unique identifiers (not pictured). Each time a read operation takes place, the counter 112 may be configured to increment. In some examples, each time data from the contactless card 104 is read (e.g., by a mobile device), the counter 112 is transmitted to the server for validation and determines whether the counter 112 are equal (as part of the validation) to a counter of the server.

The one or more counter 112 may be configured to prevent a replay attack. For example, if a cryptogram has been obtained and replayed, that cryptogram is immediately rejected if the counter 112 has been read or used or otherwise passed over. If the counter 112 has not been used, it may be replayed. In some examples, the counter that is incremented on the contactless card 104 is different from the counter that is incremented for transactions. The contactless card 104 is unable to determine the application transaction counter 112 since there is no communication between applets 110 on the contactless card 104. In some examples, the contactless card 104 may comprise a first applet 440-1, which may be a transaction applet, and a second applet 440-2. Each applet 440-1 and 440-2 may comprise a respective counter 112.

In some examples, the counter 112 may get out of sync. In some examples, to account for accidental reads that initiate transactions, such as reading at an angle, the counter 112 may increment but the application does not process the counter 112. In some examples, when the mobile device 10 is woken up, NFC may be enabled and the computing device 102 may be configured to read available tags, but no action is taken responsive to the reads.

To keep the counter 112 in sync, an application, such as a background application, may be executed that would be configured to detect when the computing device 102 wakes up and synchronize with the server of a banking system indicating that a read that occurred due to detection to then move the counter 112 forward. In other examples, Hashed One Time Password may be utilized such that a window of mis-synchronization may be accepted. For example, if within a threshold of 10, the counter 112 may be configured to move forward. But if within a different threshold number, for example within 10 or 1000, a request for performing re-synchronization may be processed which requests via one or more applications that the user tap, gesture, or otherwise indicate one or more times via the user's device. If the counter 112 increases in the appropriate sequence, then it possible to know that the user has done so.

The key diversification technique described herein with reference to the counter 112, master key, and diversified key, is one example of encryption and/or decryption a key diversification technique. This example key diversification technique should not be considered limiting of the disclosure, as the disclosure is equally applicable to other types of key diversification techniques.

During the creation process of the contactless card 104, two cryptographic keys may be assigned uniquely per card. The cryptographic keys may comprise symmetric keys which may be used in both encryption and decryption of data. Triple DES (3DES) algorithm may be used by EMV and it is implemented by hardware in the contactless card 104. By using the key diversification process, one or more keys may be derived from a master key based upon uniquely identifiable information for each entity that requires a key.

In some examples, to overcome deficiencies of 3DES algorithms, which may be susceptible to vulnerabilities, a session key may be derived (such as a unique key per session) but rather than using the master key, the unique card-derived keys and the counter may be used as diversification data. For example, each time the contactless card 104 is used in operation, a different key may be used for creating the message authentication code (MAC) and for performing the encryption. This results in a triple layer of cryptography. The session keys may be generated by the one or more applets and derived by using the application transaction counter with one or more algorithms (as defined in EMV 4.3 Book 2 A1.3.1 Common Session Key Derivation).

Further, the increment for each card may be unique, and assigned either by personalization, or algorithmically assigned by some identifying information. For example, odd numbered cards may increment by 2 and even numbered cards may increment by 5. In some examples, the increment may also vary in sequential reads, such that one card may increment in sequence by 1, 3, 5, 2, 2, . . . repeating. The specific sequence or algorithmic sequence may be defined at personalization time, or from one or more processes derived from unique identifiers. This can make it harder for a replay attacker to generalize from a small number of card instances.

The authentication message may be delivered as the content of a text NDEF record in hexadecimal ASCII format. In another example, the NDEF record may be encoded in hexadecimal format.

Figure 7:
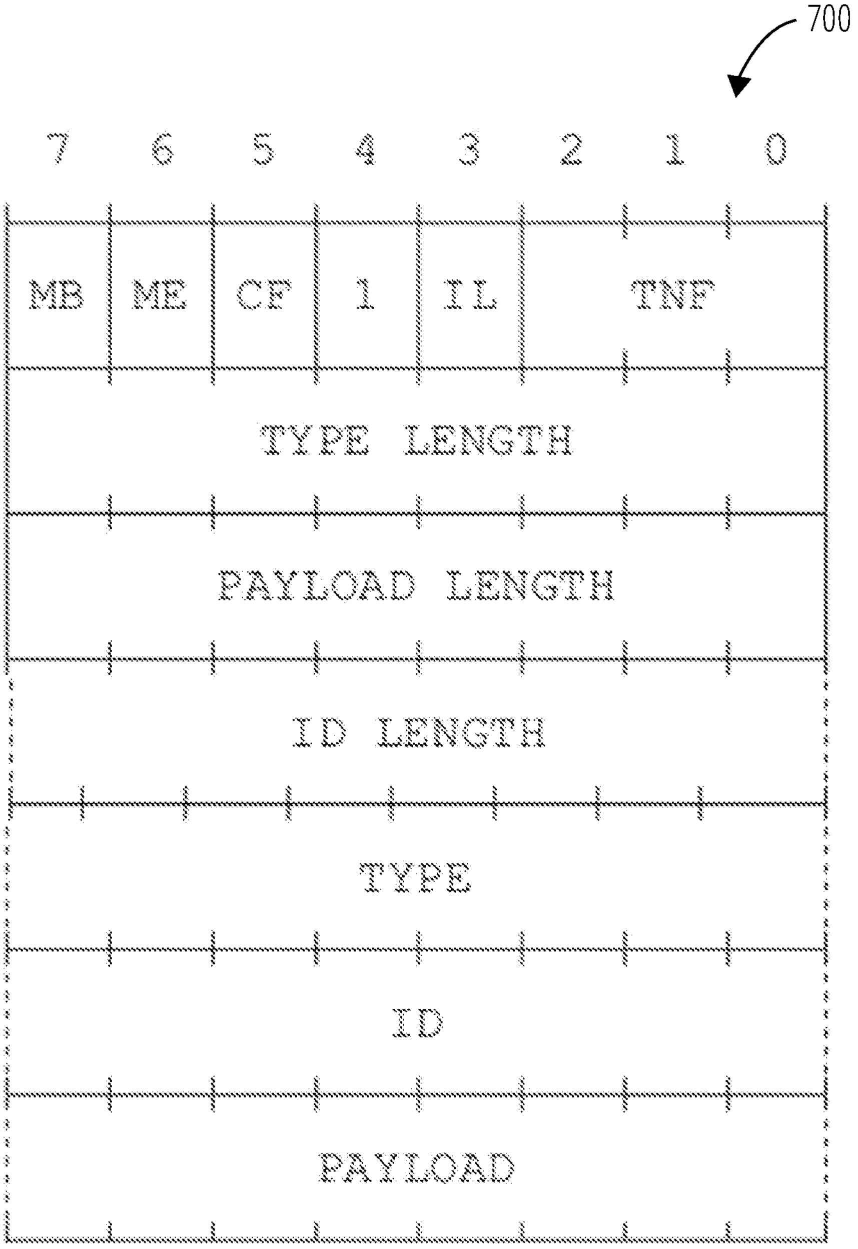
FIG. 7 illustrates a data structure in accordance with one embodiment.

FIG. 7 illustrates an NDEF short-record layout (SR=1) data structure 700 according to an example embodiment. One or more applets may be configured to encode the OTP as an NDEF type 4 well known type text tag. In some examples, NDEF messages may comprise one or more records. The applets may be configured to add one or more static tag records in addition to the OTP record. Exemplary tags include, without limitation, Tag type: well known type, text, encoding English (en); Applet ID: D2760000850101; Capabilities: read-only access; Encoding: the authentication message may be encoded as ASCII hex; type-length-value (TLV) data may be provided as a personalization parameter that may be used to generate the NDEF message. In an embodiment, the authentication template may comprise the first record, with a well-known index for providing the actual dynamic authentication data. The data structure 700 may include the URL 120, the cryptogram 130, and any other data provided by the applet 110.

Figure 8:
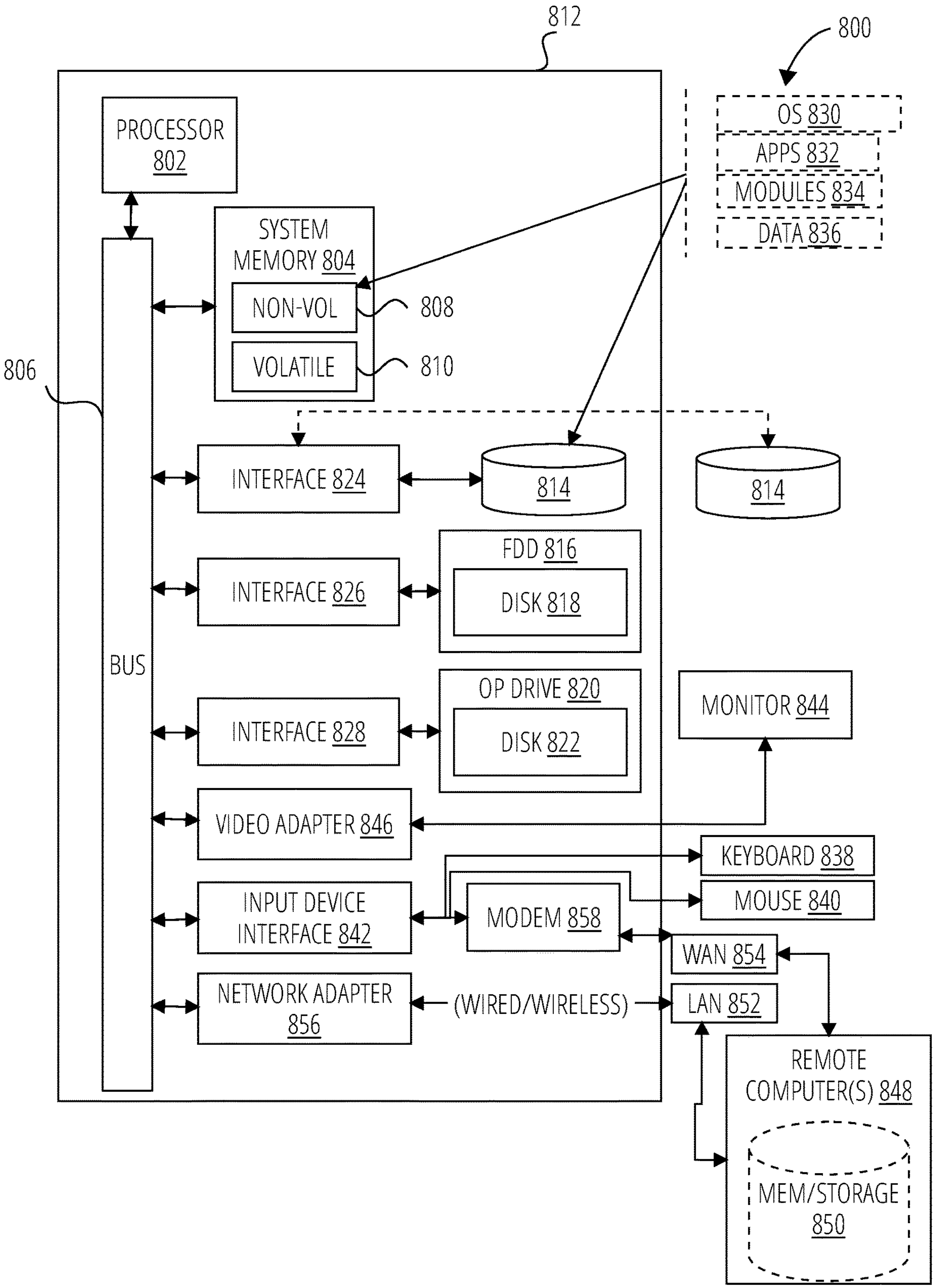
FIG. 8 illustrates a computer architecture in accordance with one embodiment.

FIG. 8 illustrates an embodiment of an exemplary computer architecture 800 suitable for implementing various embodiments as previously described. In one embodiment, the computer architecture 800 may include or be implemented as part of computing architecture 100.

As used in this application, the terms "system" and "component" are intended to refer to a computer-related entity, either hardware, a combination of hardware and software, software, or software in execution, examples of which are provided by the exemplary computing computer architecture 800. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computer architecture 800 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 800.

As shown in FIG. 8, the computer architecture 800 includes a computer 812 comprising a processor 802, a system memory 804 and a system bus 806. The processor 802 can be any of various commercially available processors. The computer 812 may be representative of the computing device 102 and/or the server 106.

The system bus 806 provides an interface for system components including, but not limited to, the system memory 804 to the processor 802. The system bus 806 can be any of several types of bus structure that may further interconnect to a memory bus (with or without a memory controller), a peripheral bus, and a local bus using any of a variety of commercially available bus architectures. Interface adapters may connect to the system bus 608 via slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The computer architecture 800 may include or implement various articles of manufacture. An article of manufacture may include a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like. Embodiments may also be at least partly implemented as instructions contained in or on a non-transitory computer-readable medium, which may be read and executed by one or more processors to enable performance of the operations described herein.

The system memory 804 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 8, the system memory 804 can include non-volatile 808 and/or volatile 810. A basic input/output system (BIOS) can be stored in the non-volatile 808.

The computer 812 may include various types of computer-readable storage media in the form of one or more lower speed memory units, including an internal (or external) hard disk drive 814, a magnetic disk drive 816 to read from or write to a removable magnetic disk 818, and an optical disk drive 820 to read from or write to a removable optical disk 822 (e.g., a CD-ROM or DVD). The hard disk drive 814, magnetic disk drive 816 and optical disk drive 820 can be connected to system bus 806 the by an HDD interface 824, and FDD interface 826 and an optical disk drive interface 828, respectively. The HDD interface 824 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and non-volatile 808, and volatile 810, including an operating system 830, one or more applications 832, other program modules 834, and program data 836. In one embodiment, the one or more applications 832, other program modules 834, and program data 836 can include, for example, the various applications and/or components of the system 100.

A user can enter commands and information into the computer 812 through one or more wire/wireless input devices, for example, a keyboard 838 and a pointing device, such as a mouse 840. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, track pads, sensors, styluses, and the like. These and other input devices are often connected to the processor 802 through an input device interface 842 that is coupled to the system bus 806 but can be connected by other interfaces such as a parallel port, IEEE 1394 serial port, a game port, a USB port, an IR interface, and so forth.

A monitor 844 or other type of display device is also connected to the system bus 806 via an interface, such as a video adapter 846. The monitor 844 may be internal or external to the computer 812. In addition to the monitor 844, a computer typically includes other peripheral output devices, such as speakers, printers, and so forth.

The computer 812 may operate in a networked environment using logical connections via wire and/or wireless communications to one or more remote computers, such as a remote computer(s) 848. The remote computer(s) 848 can be a workstation, a server computer, a router, a personal computer, portable computer, microprocessor-based entertainment appliance, a peer device or other common network node, and typically includes many or all the elements described relative to the computer 812, although, for purposes of brevity, only a memory and/or storage device 850 is illustrated. The logical connections depicted include wire/wireless connectivity to a local area network 852 and/or larger networks, for example, a wide area network 854. Such LAN and WAN networking environments are commonplace in offices and companies, and facilitate enterprise-wide computer networks, such as intranets, all of which may connect to a global communications network, for example, the Internet.

When used in a local area network 852 networking environment, the computer 812 is connected to the local area network 852 through a wire and/or wireless communication network interface or network adapter 856. The network adapter 856 can facilitate wire and/or wireless communications to the local area network 852, which may also include a wireless access point disposed thereon for communicating with the wireless functionality of the network adapter 856.

When used in a wide area network 854 networking environment, the computer 812 can include a modem 858, or is connected to a communications server on the wide area network 854 or has other means for establishing communications over the wide area network 854, such as by way of the Internet. The modem 858, which can be internal or external and a wire and/or wireless device, connects to the system bus 806 via the input device interface 842. In a networked environment, program modules depicted relative to the computer 812, or portions thereof, can be stored in the remote memory and/or storage device 850. It will be appreciated that the network connections shown are exemplary and other means of establishing a communications link between the computers can be used.

The computer 812 is operable to communicate with wire and wireless devices or entities using the IEEE 802 family of standards, such as wireless devices operatively disposed in wireless communication (e.g., IEEE 802.11 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.11 (a, b, g, n, ac, ax, etc.) to provide secure, reliable, fast wireless connectivity. A Wi-Fi network can be used to connect computers to each other, to the Internet, and to wire networks (which use IEEE 802.3-related media and functions).

The various elements of the devices as previously described with reference to FIGS. 1-7 may include various hardware elements, software elements, or a combination of both. Examples of hardware elements may include devices, logic devices, components, processors, microprocessors, circuits, processors, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. However, determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that make the logic or processor. Some embodiments may be implemented, for example, using a machine-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

The foregoing description of example embodiments has been presented for the purposes of illustration and description. It is not intended to be exhaustive or to limit the present disclosure to the precise forms disclosed. Many modifications and variations are possible in light of this disclosure. It is intended that the scope of the present disclosure be limited not by this detailed description, but rather by the claims appended hereto. Future filed applications claiming priority to this application may claim the disclosed subject matter in a different manner, and may generally include any set of one or more limitations as variously disclosed or otherwise demonstrated herein.

What is claimed is:

1. A method, comprising:

receiving, by a server from a client device, a first hypertext transfer protocol (HTTP) request comprising a link, wherein a first parameter of the link comprises encrypted data generated by a contactless card and a second parameter of the link comprises an identifier of an account associated with the contactless card;

decrypting, by the server, the encrypted data;

determining, by the server, a context of the account based on attributes of the account, wherein the attributes of the account include at least: (i) an amount of time the account has been open, and (ii) a rejected transaction using the contactless card in a transaction history of the account;

determining, by the server, an intended action associated with the request based on the determined context of the account;

selecting, by the server based on the decryption of the encrypted data and the determined intended action, a first redirect link of a plurality of redirect links;

generating, by the server, an authentication token for the account;

transmitting, by the server to the client device, an HTTP response comprising the first redirect link, wherein the first redirect link is included in a location header field of the HTTP response, and the server includes the authentication token as a first parameter of the first redirect link;

receiving, by the server from the client device, a second HTTP request comprising the first redirect link and the authentication token; and transmitting, by the server to the client device, a second HTTP response comprising a resource at the first redirect link.

2. The method of claim 1, wherein a machine learning (ML) model selects the first redirect link based on input comprising the first HTTP request, the link, and the context of the account, wherein the ML model is generated based on training data describing a plurality of redirect operations and a plurality of contexts for a plurality of accounts.

3. The method of claim 1, wherein the one or more attributes of the account further comprise: (iii) a payment state of the contactless card, wherein the payment state comprises one of an active payment state or an inactive payment state, (iv) a balance of the account, and (v) a balance of the contactless card.

4. The method of claim 1, further comprising:

determining, by the server based on the first HTTP request, whether the first HTTP request was generated by a web browser of the client device or an application of the client device, wherein the web browser is distinct from the application, wherein the server selects the first redirect link further based on whether the request was generated by the client device or the application.

5. The method of claim 4, wherein the server determines that the first HTTP request was generated by the application and the server generates the authentication token based on the determination that the application generated the first HTTP request, the method further comprising:

transmitting, by the server to the application, one or more attributes of the account based on the receipt of the authentication token from the application.

6. The method of claim 5, further comprising:

determining, by the server based on the context and the first redirect link, an identifier of a page of the application, wherein the server includes the identifier of the page of the application as a second parameter of the first redirect link, wherein the application opens the page of the application based at least in part on the second parameter of the link.

7. The method of claim 1, wherein the decrypting comprises:

incrementing, by the server, a counter value associated with the contactless card;

encrypting, by the server, the counter value and a card master key to generate a diversified key; and decrypting, by the server, the encrypted data based on the diversified key.

8. A non-transitory computer-readable storage medium having computer-readable program code embodied therewith, the computer-readable program code executable by a processor of a server to cause the processor to:

receive, from a client device, a first hypertext transfer protocol (HTTP) request comprising a link, wherein a first parameter of the link comprises encrypted data generated by a contactless card and a second parameter of the link comprises an identifier of an account associated with the contactless card;

decrypt the encrypted data;

determine a context of the account based on attributes of the account, wherein the one or more attributes of the account include at least: (i) an amount of time the account has been open, and (ii) a rejected transaction using the contactless card in a transaction history of the account;

determine an intended action associated with the request based on the determined context of the account;

select, based on the decryption of the encrypted data and the determined intended action, a first redirect link of a plurality of redirect links;

generate an authentication token for the account;

transmit, to the client device, an HTTP response comprising the first redirect link, wherein the first redirect link is included in a location header field of the HTTP response, and include the authentication token as a first parameter of the first redirect link;

receive, from the client device, a second HTTP request comprising the first redirect link and the authentication token; and transmit, to the client device, a second HTTP response comprising a resource at the first redirect link.

9. The medium of claim 8, wherein a machine learning (ML) model selects the first redirect link based on input comprising the first HTTP request, the link, and the context of the account, wherein the ML model is generated based on training data describing a plurality of redirect operations and a plurality of contexts for a plurality of accounts.

10. The medium of claim 8, wherein the one or more attributes of the account further comprise: (iii) a payment state of the contactless card, wherein the payment state comprises one of an active payment state or an inactive payment state, (iv) a balance of the account, and (v) a balance of the contactless card.

11. The medium of claim 8, the computer-readable program code executable by the processor to cause the processor to:

determine, based on the first HTTP request, whether the first HTTP request was generated by a web browser of the client device or an application of the client device, wherein the web browser is distinct from the application, wherein the processor selects the first redirect link based on whether the request was generated by the client device or the application.

12. The medium of claim 11, wherein the server generates the authentication token based on a determination that the application generated the first HTTP request, the computer-readable program code executable by the processor to cause the processor to:

transmit, to the application, one or more attributes of the account based on the receipt of the authentication token from the application.

13. The medium of claim 12, the computer-readable program code executable by the processor to cause the processor to:

determine, based on the context and the first redirect link, an identifier of a page of the application, wherein the identifier of the page of the application is a second parameter of the first redirect link.

14. The medium of claim 8, wherein decrypting the encrypted data further includes the processor being caused to:

increment a counter value associated with the contactless card;

encrypt the counter value and a card master key to generate a diversified key; and decrypt the encrypted data based on the diversified key.

15. An apparatus, comprising:

a processor; and a memory storing instructions which when executed by the processor, cause the processor to:

receive, from a client device, a first hypertext transfer protocol (HTTP) request comprising a link, wherein a first parameter of the link comprises encrypted data generated by a contactless card and a second parameter of the link comprises an identifier of an account associated with the contactless card;

decrypt the encrypted data;

determine a context of the account based on attributes of the account, wherein the one or more attributes of the account include at least: (i) an amount of time the account has been open, and (ii) a rejected transaction using the contactless card in a transaction history of the account;

determine an intended action associated with the request based on the determined context of the account;

select, based on the decryption of the encrypted data and the determined intended action, a first redirect link of a plurality of redirect links;

generate an authentication token for the account;

transmit, to the client device, an HTTP response comprising the first redirect link, wherein the first redirect link is included in a location header field of the HTTP response, and include the authentication token as a first parameter of the first redirect link;

receive, from the client device, a second HTTP request comprising the first redirect link and the authentication token; and transmit, to the client device, a second HTTP response comprising a first resource at the first redirect link.

16. The apparatus of claim 15, wherein a machine learning (ML) model executing on the processor selects the first redirect link based on input comprising the first HTTP request, the link, and the context of the account, wherein the ML model is generated based on training data describing a plurality of redirect operations and a plurality of contexts for a plurality of accounts.

17. The apparatus of claim 15, wherein the one or more attributes of the account further comprise: (iii) a payment state of the contactless card, wherein the payment state comprises one of an active payment state or an inactive payment state, (iv) a balance of the account, and (v) a balance of the contactless card.

18. The apparatus of claim 15, the memory storing instructions which when executed by the processor, cause the processor to:

determine, based on the first HTTP request, whether the first HTTP request was generated by a web browser of the client device or an application of the client device, wherein the web browser is distinct from the application, wherein the instructions cause the processor to select the first redirect link based on whether the request was generated by the client device or the application.

19. The apparatus of claim 18, wherein the apparatus generates the authentication token based on a determination that the application generated the first HTTP request, the memory storing instructions which when executed by the processor, cause the processor to:

transmit, to the application, one or more attributes of the account based on the receipt of the authentication token from the application.

20. The apparatus of claim 19, the memory storing instructions which when executed by the processor, cause the processor to:

determine, based on the context and the first redirect link, an identifier of a page of the application, wherein the identifier of the page of the application is a second parameter of the first redirect link.

* * * * *